(12) United States Patent
Van Der Sijde et al.

(10) Patent No.: US 9,068,715 B2
(45) Date of Patent: Jun. 30, 2015

(54) TUBE LUMINESCENT RETROFIT USING LIGHT EMITTING DIODES

(75) Inventors: Arjen Gerben Van Der Sijde, Eindhoven (NL); Tewe Hiepke Hiepke Heemstra, Veldhoven (NL); Nicola Bettina Bettina Pfeffer, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 19 days.

(21) Appl. No.: 13/884,990

(22) PCT Filed: Nov. 23, 2011

(86) PCT No.: PCT/IB2011/055258
§ 371 (c)(1),
(2), (4) Date: May 13, 2013

(87) PCT Pub. No.: WO2012/073156
PCT Pub. Date: Jun. 7, 2012

(65) Prior Publication Data
US 2013/0235590 A1 Sep. 12, 2013

(30) Foreign Application Priority Data
Nov. 30, 2010 (EP) ................................ 10193131
May 13, 2011 (EP) ................................ 11166004

(51) Int. Cl.
*F21V 7/00* (2006.01)
*F21S 8/04* (2006.01)
*F21V 5/04* (2006.01)
*F21V 8/00* (2006.01)
*F21W 131/402* (2006.01)
*F21Y 101/02* (2006.01)
*F21Y 103/00* (2006.01)

(52) U.S. Cl.
CPC ............ *F21V 7/0066* (2013.01); *G02B 6/0073* (2013.01); *F21S 8/04* (2013.01); *F21V 5/04* (2013.01); *F21W 2131/402* (2013.01); *F21Y 2101/02* (2013.01); *F21Y 2103/003* (2013.01)

(58) Field of Classification Search
None
See application file for complete search history.

(56) References Cited

U.S. PATENT DOCUMENTS

| | | | |
|---|---|---|---|
| 6,193,383 B1 | 2/2001 | Onikiri et al. | |
| 7,334,933 B1 | 2/2008 | Simon | |
| 8,231,256 B1 * | 7/2012 | Coleman et al. | ............. 362/601 |
| 2004/0070855 A1 | 4/2004 | Benitex et al. | |
| 2005/0090124 A1 | 4/2005 | Mohacsi et al. | |
| 2005/0138852 A1 | 6/2005 | Yamauchi | |
| 2005/0243576 A1 | 11/2005 | Park et al. | |
| 2005/0265042 A1 | 12/2005 | Kim et al. | |
| 2006/0067640 A1 | 3/2006 | Hsieh et al. | |

(Continued)

FOREIGN PATENT DOCUMENTS

| | | | |
|---|---|---|---|
| EP | 0945673 A1 | 9/1999 |
| JP | 3143784 A | 6/1991 |
| KR | 20100004617 A1 | 7/2008 |
| KR | 883345 B1 | 8/2008 |

(Continued)

*Primary Examiner* — Ashok Patel
(74) *Attorney, Agent, or Firm* — Yuliya Mathis

(57) ABSTRACT

The invention relates to a LED-based optical unit including a LED disposed on a surface and a monolithic module encompassing the LED and including a re-directing portion and a first diffusing portion. The first diffusing portion is configured to diffuse light incident thereon. The re-directing portion is configured to re-direct at least a first portion of light emitted by the LED to be incident on the first diffusing portion.

14 Claims, 24 Drawing Sheets

(56) References Cited

U.S. PATENT DOCUMENTS

2008/0089062 A1 4/2008 Vennetier et al.
2010/0020565 A1 1/2010 Seward
2012/0287375 A1* 11/2012 Matsuki et al. ................. 349/64

FOREIGN PATENT DOCUMENTS

| | | |
|---|---|---|
| KR | 883346 B1 | 8/2008 |
| TW | 200818540 A | 4/2008 |

* cited by examiner

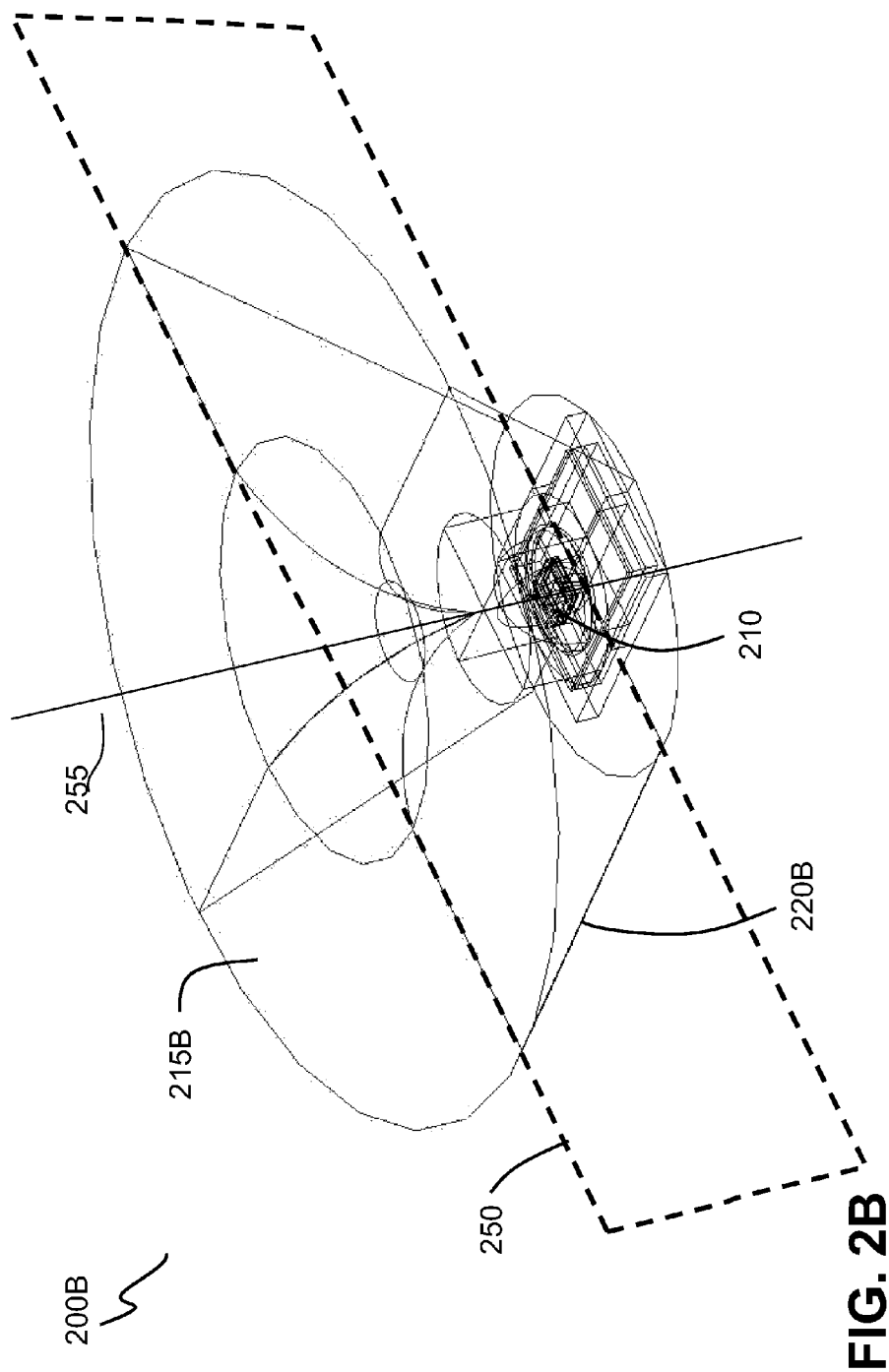

TUBE LUMINESCENT RETROFIT USING LIGHT EMITTING DIODES

FIELD OF THE INVENTION

Embodiments of the present invention relate generally to the field of illumination systems, and, more specifically, to LED-based optical units.

DESCRIPTION OF THE RELATED ART

As the efficacy (measured in lumen per Watt) and the luminous flux (measured in lumen) of light emitting diodes (LEDs) increases and prices go down, it is expected that LED illumination and LED based lamps soon will be serious alternatives to and at a competitive level with until now predominant tube luminescent (TL) based lamps for providing large-area illumination. Such lamps are typically found in office buildings in forms of 15 centimeter- to 2.4 meter-long tubes, having diameters ⅝ inch, 1 inch, 1.25 inch or even larger, providing uniform luminance along the length of the tube. A typical TL luminous flux output density is 3000 lumen per meter tube length. For LED retrofit, also lower values may be found.

Current LED lamps are fabricated by placing a large number of LEDs in a linear array on a substrate where each LED is encompassed by a lens configured to re-direct light emitted by the LED in a direction perpendicular to the LED array and parallel to the plane of the substrate onto a curved reflection surface. FIG. 1 illustrates one such lamp 30 disclosed in US 2005/0265042. As shown, the lamp 30 includes two LED arrays, where each LED array comprises LEDs 10 disposed in a row on a substrate 20 along the length of the corresponding reflection surface 31. Because, as shown in FIG. 1, the reflection surface 31 is curved, the light incident thereon in a horizontal direction is reflected in the vertical direction, thereby providing illumination.

One drawback of such an arrangement is that providing a curved reflection surface poses fabrication challenges. Another drawback is that some of the light emitted by each of the LEDs is lost due to the light having to go through the corresponding lens, exit the lens, and then be reflected by the reflection surface.

What is needed in the art is a solution that can improve on at least some of the problems described above.

SUMMARY OF THE INVENTION

According to one aspect of the invention, an optical unit is provided. The unit includes a LED disposed on a surface and a monolithic module encompassing the LED. The monolithic module includes a re-directing portion and a first diffusing portion, where the first diffusing portion is configured to diffuse light incident thereon and the re-directing portion is configured to re-direct at least a first portion of light emitted by the LED to be incident on the first diffusing portion.

According to another aspect of the invention, a lamp comprising two or more of such optical units is disclosed. In one embodiment, the two or more of such units may be arranged in a row within e.g. a tubular case, thereby together forming a linear light source. In another embodiment, a number of such units may be arranged in a grid or in any other pattern, thereby together forming an areal light source. The lamp may further include an optional cover which could e.g. provide additional diffusion of the light generated by the units.

According to yet another aspect of the invention, a lamp comprising at least two LEDs encompassed by a single monolithic module is disclosed ("extruded profile").

As used herein, the term "monolithic" is used to describe a module where a portion of the module having one functionality (e.g. the light diffusing portion) is an integral part of another portion of the module having another functionality (e.g. the light propagating portion) or, in other words, where the different optical properties are realized on different portions of one single body.

The present invention is based on the recognition that making the first diffusing portion an integral part of the re-directing portion of the monolithic module allows significantly simplifying the fabrication of the optical system while preserving the desired functionality. Providing the first diffusing portion may then simply comprise e.g. applying white paint to the appropriate surfaces of a lens or e.g. using 2K molding, where the lens could be employed to re-direct light emitted by the LED to be incident onto the white paint or plastic.

In an embodiment, the re-directing portion is further configured to guide a second portion of light emitted by the LED to not be incident on the first diffusing portion. This embodiment provides that some of the light emitted by the LED may "leak out" from the monolithic module without being diffusively reflected by the first diffusing portion. In one embodiment, such "leaked out" light could comprise 5-10% of the light emitted by the LED, however, this percentage may be further adjusted in order to e.g. obtain sufficiently uniform appearance of the lit unit. For maximal efficiency with highest glare reduction, this percentage should be as low as possible. However, for minimized spot-non-uniformity, the summed amounts of lumen per unit surface of the lamp from the leaked-out light and from the light diffused by the diffusing portion should preferably be the same everywhere on the observed surface.

Positions and shapes where the light leaks out (e.g., top center of the monolithic module, the corners of the module, etc.) and the amount and direction of the leaked light rays may also be optimized in terms of the uniform source luminance. For a purely refractive re-directing portion of the monolithic module, this can be done by adding carefully calculated corrugations (e.g. microstructures like micro-lenses, 'holographic diffuser'-like structures or other microstructures with a defined angular distribution) to selected positions of the outer surface of the module. If the outer surface of the module is a mirror, similar structures could be added but, in addition to that, the mirror can be locally made more or less transparent to get the desired kind of leakage. Alternatively or additionally, controlled light leakage may be achieved by introducing one or more concentric rings on the inner surface and/or the outer surface of the re-directing portion and/or extending between the inner surface and the outer surface. If the re-directing portion is rotationally symmetric, the center of the concentric rings may be adapted to coincide with an axis of symmetry of the re-directing portion. Such rings could allow easier modification of the optics. Therefore, the symmetry of the rings is preferably linked to the symmetry of the optics (i.e., the re-directing portion) and/or the lamp incorporating such optics rather than to the symmetry of the corresponding LED. Of course, in other embodiments, the rings could be made symmetric with respect to the axis of symmetry of the beam pattern of the corresponding LED.

Furthermore, there may be an extra volume diffuser and/or surface diffuser present between the optional diffusing cover and the module, to improve the uniformity of the provided illumination still further. The extra volume and/or surface diffuser may have an optimized shape and/or optical properties that vary over its volume or surface, respectively. If the re-directing portion of the module is transparent, it may also contain scattering elements in the bulk or on the surface to induce light leakage.

In an embodiment targeted for best spot uniformity, the second portion may include less than 45% of the light emitted by the LED. This embodiment advantageously specifies that most of the light emitted by the LED (55% or more) can be diffused.

In an embodiment targeted for best efficiency but not for best spot uniformity, the second portion may include less than 5-10% of the light emitted by the LED. This embodiment advantageously specifies that most of the light emitted by the LEDs (90% or more) can be diffused with only a small fraction of the light being "leaked out" from the module.

In an embodiment, the monolithic module may further include a second diffusing portion and the re-directing portion may further be configured to re-direct a third portion of light emitted by the LED to be incident on the second diffusing portion so that a projection (onto the 'back plane' surface where the LED is mounted on) of the average direction of the re-directed first portion of light and a projection (onto the 'back plane' surface where the LED is mounted on) of the average direction of the re-directed third portion of light form an angle between 0 degrees and 180 degrees. This embodiment specifies that some of the light emitted by the LED may be re-directed e.g. not only to the opposing side surfaces of the module, but also in other directions. This may be particularly advantageous for obtaining uniform illumination from lamps including e.g. four or more such units arranged in a rectangular pattern, all of the units thereby together forming an areal light source.

In an embodiment, the monolithic module may be rotationally symmetric with an axis of symmetry of the monolithic module coinciding with an axis of symmetry of a beam pattern of the LED.

As used herein, the term "rotationally symmetric structure" refers to a structure having symmetry with respect to rotations to certain or all angles around an axis of symmetry of the structure. In one embodiment, the monolithic module may be rotationally symmetric with respect to rotations of all angles around the axis of symmetry of the module, thus, having a circular top profile. In another embodiment, the monolithic module may be rotationally symmetric with respect to rotations of only particular angles around the axis of symmetry of the module, thus, having a non-circular but symmetric top profile. For example, a monolithic module which has rotational symmetry with respect to rotations of 90 degrees may have a square top profile.

Further, as used herein the term "beam pattern" of a LED refers to the intensity distribution of the LED which gives the flux per solid angle in all direction of space.

In an embodiment, the LED may include a light emitting die and a dome disposed over the light emitting die and configured to seal the die, where the monolithic module is disposed over the dome. This embodiment specifies that the monolithic module may be included as "secondary optics," where, as used herein, this term refers to optical elements not included within a LED package. By contrast, the term "primary optics" typically refers to elements included within a LED package such as a light emitting die, a dome disposed over the die and configured to protect the die, etc.

In an embodiment, the LED may include a light emitting die and the monolithic module may be disposed immediately over the die. In contrast to the previous embodiment, this embodiment provides that the monolithic module may be included as "primary optics" in a LED package.

In yet other embodiments, the LED may include a number of light emitting dies having either the dome(s) disposed over them or directly the monolithic module.

In an embodiment, the re-directing portion may be configured to re-direct light by total internal reflection. In contrast to some prior art implementations which re-direct light with mirrors, this embodiment provides the advantage of the re-directing portion having minimal losses in guiding the light emitted by the LED.

In an embodiment, the first diffusing portion includes a material having diffusive properties disposed on parts of the re-directing portion of the monolithic module. Such a material may e.g. be white paint or white plastic.

In an embodiment, the unit may further include a diffusing cover configured to diffusively transmit light incident thereon, where the first diffusing portion may be configured to diffusively reflect the light incident thereon to be incident on the diffusing cover. This embodiment provides for additional diffusion by a diffusively transmitting cover. In a preferred embodiment, each beam of the first portion of light emitted by the LED is diffusively reflected only once by the first diffusing portion before either being directly transmitted out of the unit or being diffusively transmitted out of the unit via the cover. The light being reflected in this manner allows keeping light losses to a minimum.

In an embodiment, the LED may comprise a high-power LED capable of emitting light with luminous flux of 65 or more lumens. Including high-power LEDs in lamps allows using less LEDs to obtain the desired luminance output from the lamps, thereby decreasing the cost and the complexity of the lamps. In addition, since high-power LED dies capable of emitting such fluxes usually have sizes larger than $1\times1$ mm$^2$, including a monolithic module where the inner surface of the module is modified to include a peak is particularly advantageous for such LEDs. However, while the embodiments disclosed herein may be especially beneficial for using high-power LEDs, of course, the teachings of the present invention could also be implemented with LEDs having luminous flux of less than 65 lumen.

In an embodiment, the monolithic module may comprise an inner surface and an outer surface such that the inner surface is adapted to form a chamber, where the chamber is adapted to at least partially encompass the LED, the inner surface is adapted to refract at least a first part of the first portion of light emitted by the LED to be incident on the outer surface (before being incident on the first diffusing portion), the outer surface is adapted to reflect the first part of the first portion of light incident thereon by total internal reflection, and the inner surface comprises a peak. The peak may be considered to be formed by two portions of the inner surface and would preferably be adapted to be above the center of the LED. In various embodiments, in a cross-sectional view of the unit, the cross-section being taken so as to include an axis of symmetry of the beam pattern of the LED, the two portions could comprise e.g. two linear portions of the inner surface joining at an angle (i.e., the two linear portions form an angle less than 180 degrees), two convex curves, two concave curves, or any combination of each of the two portions being a linear portion, a convex curve, or a concave curve, where, optionally, the peak may further be rounded. In some embodiments, the peak may be considered to be a "head" of the inner surface of the monolithic module while the portions of the inner surface next to the peak could be considered to be the "shoulders." However, in other embodiments, the peak may be considered to be a "head" of the inner surface without having any "shoulders" in the inner surface of the monolithic module.

As used herein, the inventive concept of an inner surface of a monolithic module comprising a peak is intended to cover all embodiments where the inner surface is adapted to form a chamber, around a LED, which chamber has aspherical, generally convex shape. The term "generally convex" is used to describe a shape that, while it may include some concave or linear portions, is, in general, convex, such as e.g. the inner surfaces shown in FIG. 16. In line with these definitions, the concept of the inner surface comprising a peak does not cover the inner surface forming a dome-shaped chamber (because dome is spherical, not aspherical) and does not cover the inner surface forming a rectangular chamber with the LED adapted to be disposed along a side of the rectangle (because the rectangle is not "generally convex").

Such a monolithic module could be used to re-direct the light emitted by the LED from substantially vertical direction to substantially horizontal or downward horizontal ("backwards") direction. Such a module could also be used as an incoupling structure adapted to couple light emitted by the LED into a light guide, in which case the module could be an integral part of the light guide.

The idea of the inner surface of the monolithic module having a peak is based on the recognition that, when thickness of the module is reduced to the point that the size of the LED's emitting surface is comparable with the thickness of the module, the LED may no longer be considered to be a point light source emitting light from a single point at the center of the emitting surface. Instead, particular attention must be given to the extended size of the LED's emitting surface when determining the shape of the module that would allow all light beams emitted by the LED and incident on the outer surface to be reflected by TIR. When such attention is not given, light beams emitted from near the edges of the LED's emitting surface could enter the module at such an angle that a TIR condition at the outer surface of the module is not satisfied and these light beams will escape, or leak out from, the module. Therefore, care should be taken to ensure that light beams emitted from near the edges of the LED's emitting surface are incident on the outer surface of the module in a manner that the TIR condition would still be satisfied. Without increasing the overall thickness of the module, such care includes adapting the shape of the inner surface with respect to the maximum thickness of the module and the shape of the outer surface of the module so that all of the light beams emitted by the LED and incident on the inner surface, even the light beams emitted from near the edges of the LED's emitting surface, could be refracted by the inner surface at such angles that the angles of incidence of the refracted light beams on the outer surface of the LED would satisfy the TIR condition. Only then can substantially all of the light beams emitted by the LED be contained in the monolithic module.

A dome-shaped inner surface used in the prior art implementations, described below and illustrated in FIG. 5, is not optimal in terms of the minimized light leakage because some of the light beams emitted from near the edges of the LED may leak out from the outer surface of the module, as shown in FIGS. 13B and 13D and explained in greater detail below. By contrast, an inner surface according to the embodiments of the present invention including a peak above the LED is more optimal because only for such not-dome-shaped surfaces a shape could be determined, with respect to the shape of the outer surface and the maximum thickness of the module, so that all of the light beams emitted by the LED would be refracted by the inner surface at such angles that the angles of incidence of the refracted light beams on the outer surface of the module would satisfy the TIR condition.

In an embodiment, not the entire monolithic module but only the inner surface of the module may be rotationally symmetric with an axis of symmetry of the inner surface adapted to coincide with an axis of symmetry of a beam pattern of the LED (i.e., the chamber adapted to encompass the LED may be made rotationally symmetric) and vice versa.

In an embodiment, in a cross-section of the unit, the cross-section including the axis of symmetry of the beam pattern of the LED, the peak is at a point along the axis of symmetry of the beam pattern of the LED. Thus, the inner surface of the module would include a single peak above the LED, along the axis of symmetry of the beam pattern of the LED.

Hereinafter, an embodiment of the invention will be described in further detail. It should be appreciated, however, that this embodiment may not be construed as limiting the scope of protection for the present invention.

BRIEF DESCRIPTION OF THE DRAWINGS

In all figures, the dimensions as sketched are for illustration only and do not reflect the true dimensions or ratios. All figures are schematic and not to scale. In particular the thicknesses are exaggerated in relation to the other dimensions. In addition, details such as LED chip, wires, substrate, housing, etc. have sometimes been omitted from the drawings for clarity.

FIG. 2B illustrates a three-dimensional view of an optical unit, according to another embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 2A:
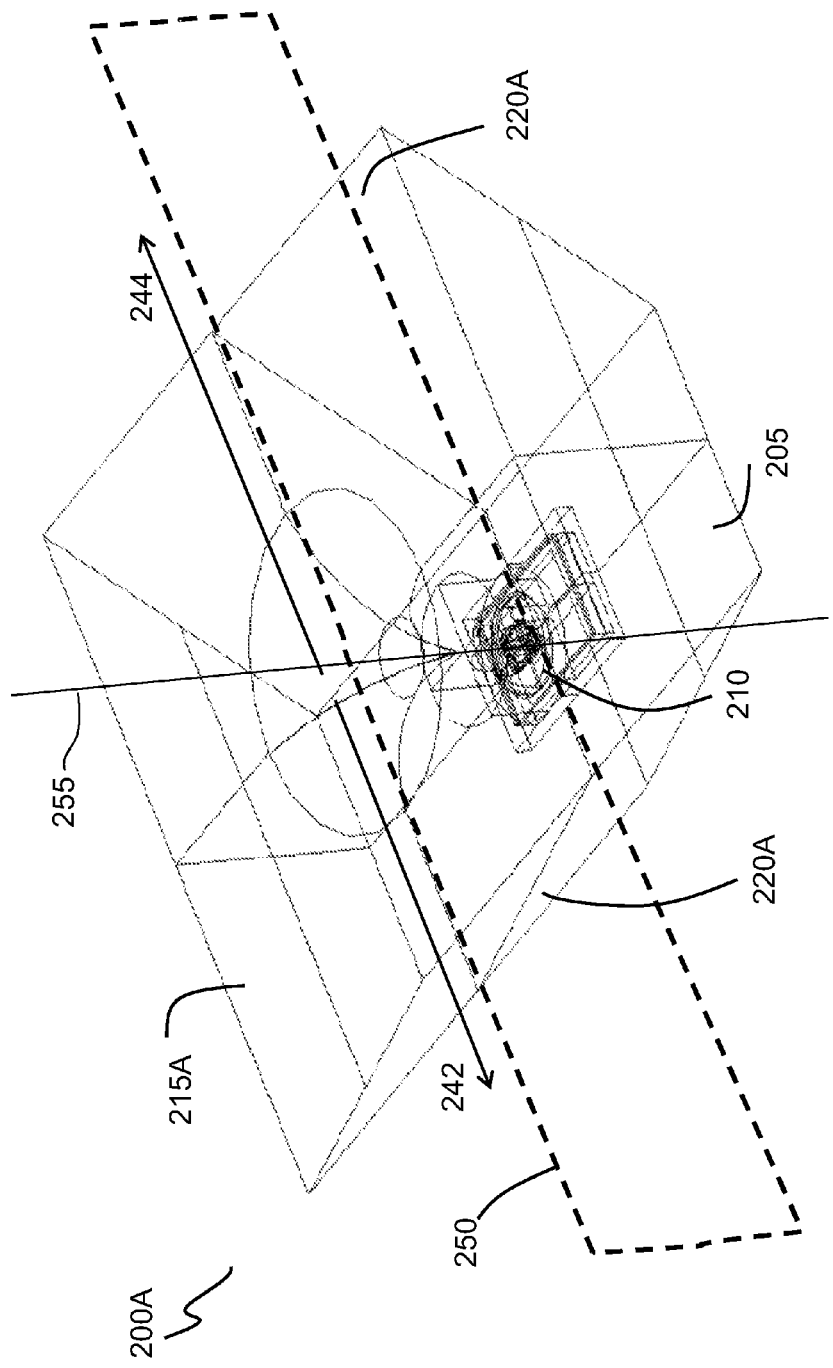
FIG. 2A illustrates a three-dimensional view of an optical unit, according to one embodiment of the present invention.

FIG. 2A illustrates a three-dimensional view of an optical unit 200A, according to one embodiment of the present invention. As shown, the unit 200A includes a LED 210 encompassed by a module 215A and disposed on the same plane (e.g., the top surface of a printed circuit board) as a bottom surface 205 of the module 215A. Side surfaces 220A of the module 215A are made so that they diffusively reflect light incident on them. The bulk of the module 215A is a re-directing and light propagating structure configured to guide the light emitted by the LED 210 to be incident onto the side surfaces 220A.

Since portion of the module 215A configured to diffusively reflect light is the side surface(s) of the module 215A while portion of the module 215A configured to guide light onto the diffusing portion is the bulk of the module 215A, such a module 215A may be said to be a monolithic module including a light diffusing portion (i.e., the surfaces 220A) and a light re-directing portion (i.e., the bulk of the module 215A and the rest of the surfaces of the module 215A besides the surfaces 220A), where the diffusing portion and the re-directing portion are integral portions of a single body. A person skilled in the art would recognize that since "diffusing of light" is also "re-directing of light," the diffusing portion also re-directs light incident thereon. However, for the discussions provided herein, the difference between the diffusing portion and the re-directing portion is that while the diffusing portion not only diffuses but also re-directs light, the re-directing portion re-directs but does not diffuse light.

In the embodiment shown in FIG. 2A, the re-directing portion of the module 215A may be a lens designed to change the path of light emitted by the LED 210 to be incident on the diffusing surfaces 220A mainly along the transverse direction (shown with arrows 242 and 244) of the unit 200A or of a lamp in which the unit 200A could be incorporated.

In other embodiments, the module 215A may have different shapes in order to guide light emitted by the LED 210 in other directions e.g. perpendicularly to the transverse direction as to allow mixing of light between different modules when placed next to each other. Furthermore, the surface and/or the side walls of the module 215A may be optimized to redirect the light to provide the desired luminance over the whole length of the diffusing surfaces. One such embodiment is shown in FIG. 2B, which illustrates a three-dimensional view of an optical unit 200B according to another embodiment of the present invention. In FIG. 2B, elements with the same reference numbers as in FIG. 2A illustrate the same elements as in the FIG. 2A. Therefore, all of the above discussions with respect to these elements are also appropriate here and, in the interests of brevity, are not repeated.

The unit 200B differs from the unit 200A in that the module 215B is circularly symmetric with respect to all angles of rotation around an axis 255, where the axis 255 is the axis of symmetry of a beam pattern of the LED 210. The unit 200B further differs from the unit 200A in that the diffusing portion of the module 215B is the surface shown as surface 220B and that the bulk of the module 215B is configured to guide the light emitted by the LED 210 onto the surface 220B surrounding the LED 210 on all the sides, as opposed to guiding the light mostly onto the side surfaces 220A.

Figure 2C:
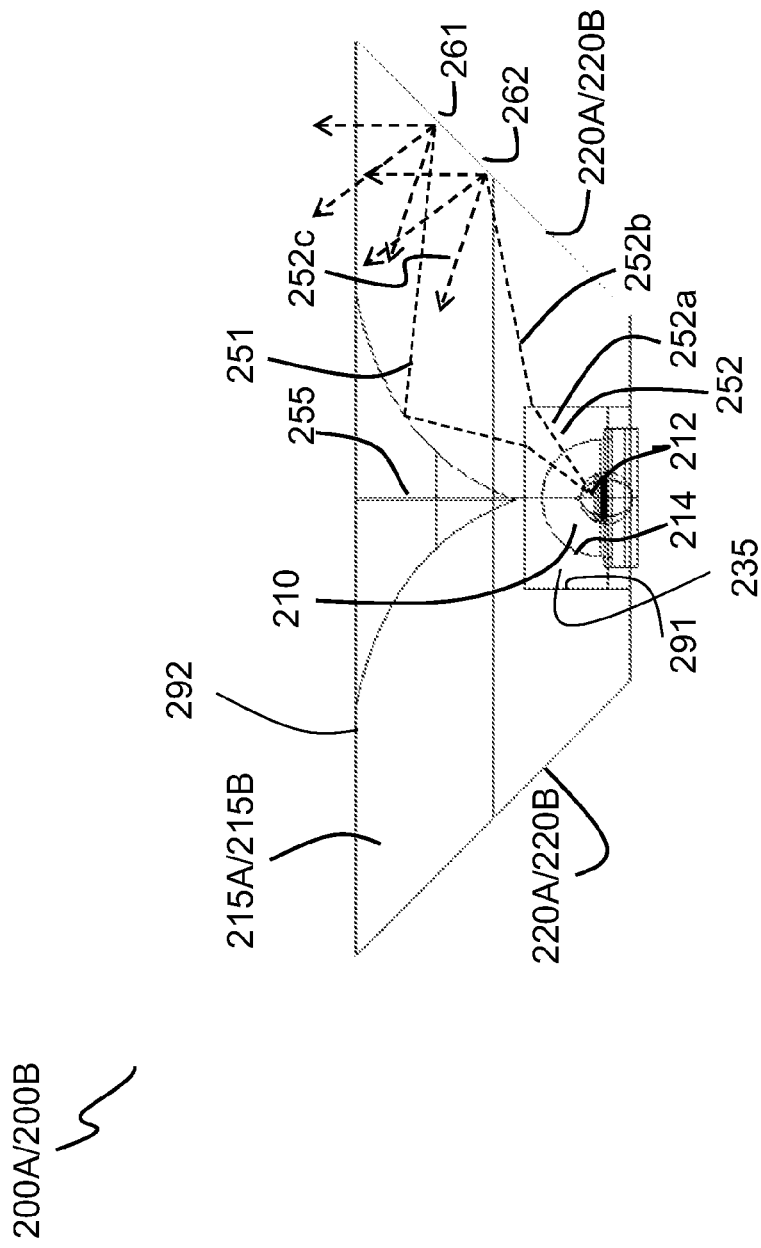
FIG. 2C illustrates a cross-sectional side view of the optical units of FIGS. 2A and 2B.

As shown in the three-dimensional views of FIGS. 2A and 2B, both of the modules 215A and 215B may be symmetrical with respect to a plane shown as a plane 250. In order to explain the operation of the units 200A and 200B in greater details, a cross-sectional side view of these units is illustrated in FIG. 2C. The cross-section of FIG. 2C is taken along the plane 250, so that the cross-section of the unit 200A looks the same as the cross-section of the unit 200B. Therefore, in FIG. 2C, element numbers listed with a dash sign (e.g. "215A/215B") intend to indicate that the element could belong to the unit 200A or to the unit 200B and the following description applies to both units.

In operation, the LED 210 emits light (either as a top-emitter LED or a side-emitter LED) which is incident on the module 215A. In various embodiments, the LED 210 may comprise a high-power LED, capable of providing light with luminous output of 65 or more lumen. As shown in FIG. 2C, the LED 210 may include a LED die 212 covered with a dome 214. The LED die 212 is configured to emit light in response to a drive signal. Material used as the LED die 212 primarily determines characteristics of the LED 210, such as e.g. color, brightness, and/or intensity of light. Possible materials that could be used for the LED die 212 include inorganic semiconductors, such as e.g. GaN, InGaN, GaAs, AlGaAs, or organic semiconductors, such as e.g. small-molecule semiconductors based on $Alq_3$ or polymer semiconductors based e.g. on the derivatives of poly(p-phenylene vinylene) and polyfluorene.

The dome 214 is usually configured to protect the LED die 212 from the environmental factors and/or determine characteristics of the LED such as e.g. maximizing the total luminous flux of the LED while still fitting within a certain envelope or matching the intensity profile of the LED for the largest number of applications. In various embodiments, the dome 214 may actually have a different shape than the half-dome illustrated in FIG. 2C, suitable for particular requirements for applications of the LED 210.

As shown in FIG. 2C with a gap 235, in the illustrated embodiment, the module 215A encompasses the LED 210 without being in physical contact with the LED 210. Thus, the gap 235 is the gap between the dome 214 of the LED 210 and the module 215A. The gap 235 may be air or may be filled with a material having suitable optical properties. In the latter case, this may require a different shape of the module 215A. In an alternative embodiment (not shown in FIG. 2C), the module 215A may also be in physical contact with the LED 210.

While FIG. 2C illustrates the LED 210 including the light emitting die 212 covered with the dome 214, the unit 200A could also be implemented without including the dome 214 as a part of the LED 210. Instead, the module 215A itself may be used to perform the functions of the dome over the light emitting die 212. In such embodiments, the module 215A may be referred to as a "primary" optical component of a LED package including the LED 210 and the module 215A and may be disposed either immediately over the light emitting die 212 (i.e., be in contact with the die, no gap between the LED 210 and the module 215A, such as e.g. the gap 235) or may encompass the die 212 with a gap (similar to e.g. the gap 235).

As shown in FIG. 2C, in operation, the LED die 212 emits light, schematically shown with rays 251 and 252, which is first incident on the module 215A. The re-directing portion of the module 215A is then configured to refract and reflect the majority of the light (e.g. greater than 80-90%) to be incident onto the diffusing surfaces 220A. FIG. 2C illustrates the ray 251 to be incident on the surface 220A at a point 261 and the ray 252 to be incident on the surface 220A at a point 262. In turn, the surfaces 220A diffusively reflect the light incident on them in different vertical directions, as is schematically shown with arrows originating from the points 261 and 262.

Such operation may be illustrated by tracing, for example, the ray 252. The ray 252 has three segments: 252*a*, 252*b*, and 252*c*.

The segment 252*a* illustrates a segment of the ray 252 emitted by the LED die 212 before it is refracted at the boundary between the material filling the gap 235 and the module 215A. Note that, while this is not illustrated in FIG. 2C in order not to clutter the drawings, the segment 252*a* may also be refracted at the boundary between the dome 214 and the material filling the gap 235, depending on the refractive indices of the respective materials at the boundary.

The segment 252*b* illustrates a segment of the ray 252 after it was refracted at the boundary between the material filling the gap 235 and the module 215A and being guided by the re-directing portion of the module 215A to be incident on the surface 220A at the point 262.

In a preferred embodiment, the re-directing portion of the module 215A may be fabricated from a material that does not absorb light emitted by the LED 210 and is designed to guide the light emitted by the LED 210 based on the total internal reflection principle. For example, the re-directing portion of the module 215A may be fabricated from transparent PMMA, polycarbonate, glass, or comparable materials. In other embodiments, the re-directing portion of the module 215A could also be implemented with mirror surfaces (e.g. metallic or dielectric), either hollow or filled with transparent material.

The segment 252*c* illustrates a part of the ray 252 after it was diffusively reflected by the surface 220A. In one embodiment, the surface 220A may comprise a flat white material disposed on the surface of the module 215A and comprised e.g. of white plastic, white paint or the like.

While FIG. 2C illustrates rays to be guided onto the surface 220A on the right side of the unit 200A, similar illustrations and descriptions could be extended to the surface 220A on the other sides of the unit 200A.

Figure 1:
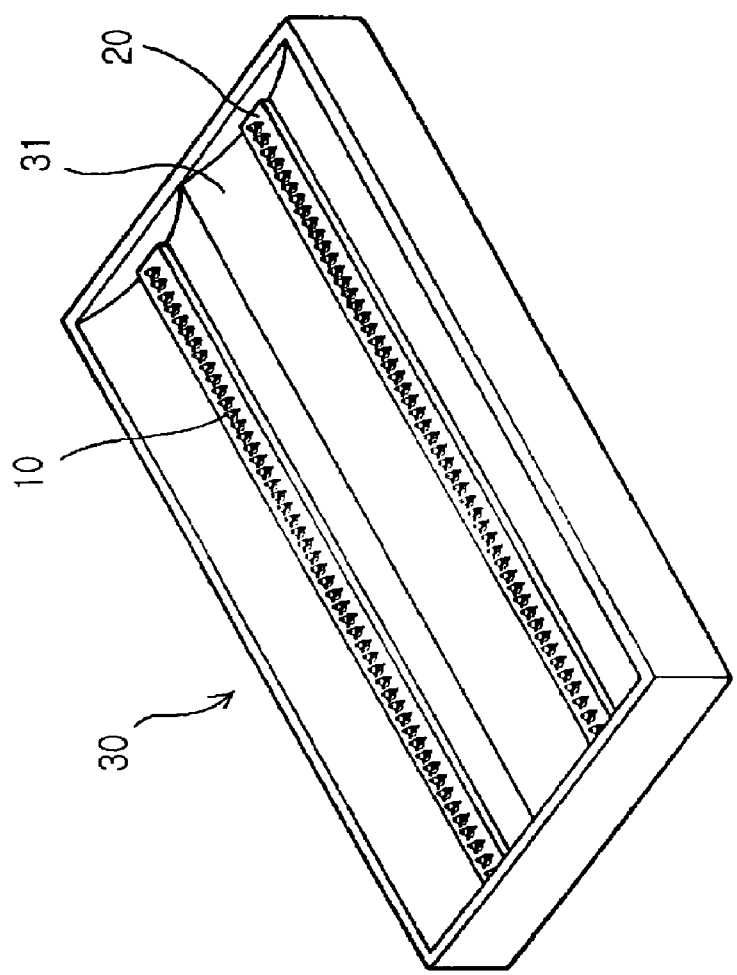
FIG. 1 illustrates a LED-based lamp according to prior art.

The module 215A being a monolithic module comprising a diffusing portion and a re-directing portion is in contrast to prior art implementations where the light emitted by a LED was re-directed by a lens onto a diffuser which was a different element, such as e.g. a separate curved surface illustrated in FIG. 1. Fabricating a unit where the diffusing portion is an integral part of the re-directing structure by e.g. applying white paint to the appropriate portions of the re-directing structure or e.g. using a 2K-molding process could make fabrication of the fixtures, systems, and/or lamps with units such as 200A significantly easier in comparison with the structure of FIG. 1. In addition, to minimize optical losses, the bottom surface 205 and/or the relevant (i.e., close to the LED) part of the mounting plane on which the monolithic unit and the LED are mounted may be converted into a reflecting diffusing surface, by also applying white paint or 2K moulding to these parts. This may reduce the optical requirements on the other surfaces of the lamp, so that the requirements may then be optimized for e.g. best mechanical or thermal properties. This advantage of reduced requirements is further enhanced if the monolithic module is implemented as the round shape 215B, or if it is implemented as shape 215A but with three, four, or more diffusively reflecting surfaces 220A, so that the top surface and the bottom surface of the module 215A each have the shape of a polygon.

In order to minimize light losses, the module 215A may be designed in such a way that the light is preferably only reflected once by the diffusing surface 220A before escaping the unit 200A or before being incident on an optional cover covering the unit 200A (not shown). In order to approach this optimum as much as possible, the re-directing portion of the module 215A could have a beam pattern of which the largest possible fraction hits the diffusing portion of the module 215A. In one embodiment, the optional cover may comprise a transparent material so that the cover simply transmits the light incident thereon. Alternatively, the optional cover may comprise a diffusively transmitting layer, configured to diffusively transmit the light incident thereon, thereby improving the uniformity of the illumination provided by the unit 200A.

As used herein, the term "diffusively reflect" and the derivatives thereof refer to more than 80-90% of light being quasi-Lambertian reflected and the term "diffusively transmit" and the derivatives thereof refer to more than 40-60% of light being quasi-Lambertian transmitted. Preferably, the diffusive properties of the optional cover should be optimized to maximize the amount of transmitted light while still fulfilling the uniformity requirements.

The re-directing portion of the module 215A may be designed to guide most of the light generated by the LED 210 to be incident on the surface 220A. Optionally, at least a portion of the bottom of the module 215A may be made at least partially reflective in order to prevent absorption of light which would lower efficiency of the unit 200A.

The optimal fraction of the light generated by the LED 210 to be incident on the surface 220A depends on the acceptable compromise between luminance uniformity and efficiency for a particular device where the unit 200A would be employed. For example, for a lamp including two or more units 200A arranged e.g. in a row, 100% of the light generated by each of the LEDs 210 could be incident on the respective surfaces 220A for best efficiency with highest glare reduction.

In other embodiments, the re-directing portion of the module 215A may include one or more segments (not illustrated in FIG. 2C) from which a portion of light emitted by the LED 210 may "leak out" (i.e., escape the module 215A without being guided to be incident on the surface 220A). In one further embodiment, the leaked out light may be incident on an optional diffusing cover that could cover the module 215A (not shown in FIG. 2C). Such an optional diffusing cover may be configured to diffusively transmit light incident thereon (similar to the optional diffusing cover described above).

Figure 4A:
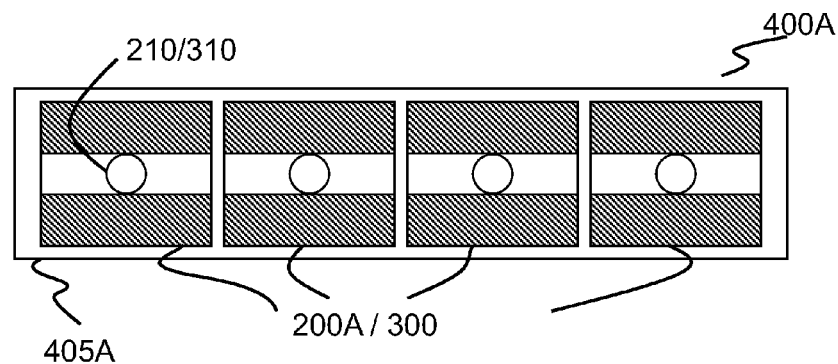
FIGS. 4A-4E illustrate some exemplary ways for arranging the optical units of FIGS. 2A, 2B, and 3A within a lamp, according to various embodiments of the present invention.
Figure 4B:
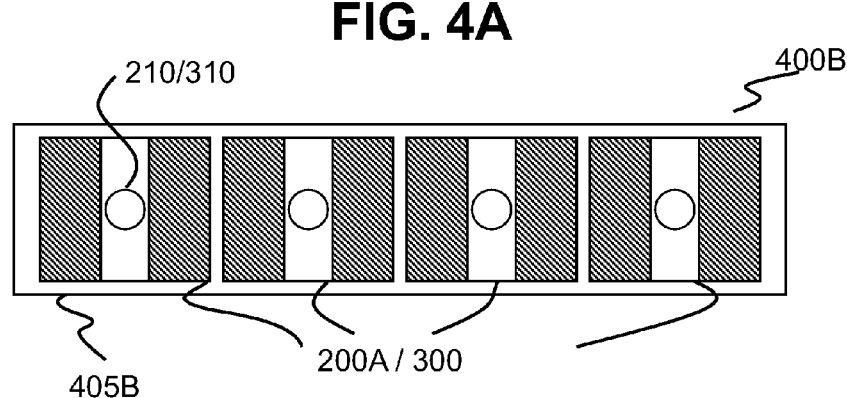
Figure 4C:
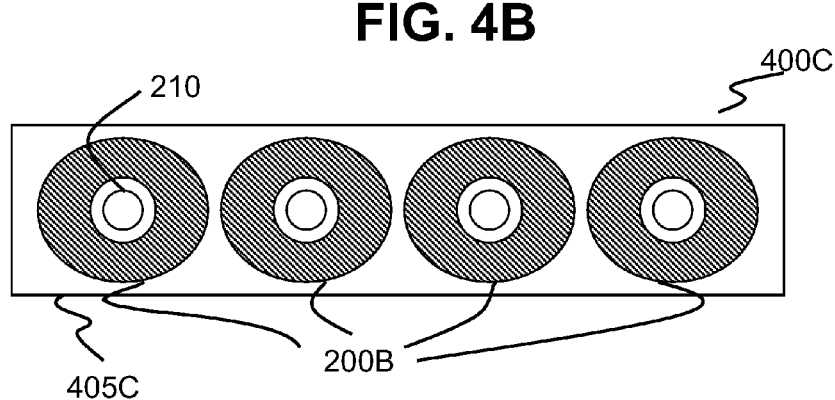
Figure 4E:
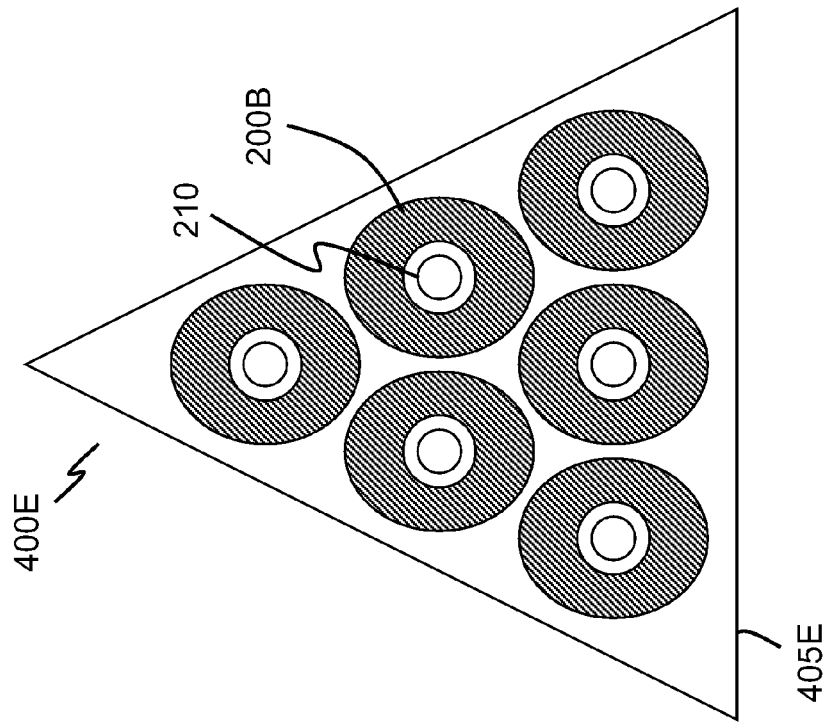
Figure 4D:
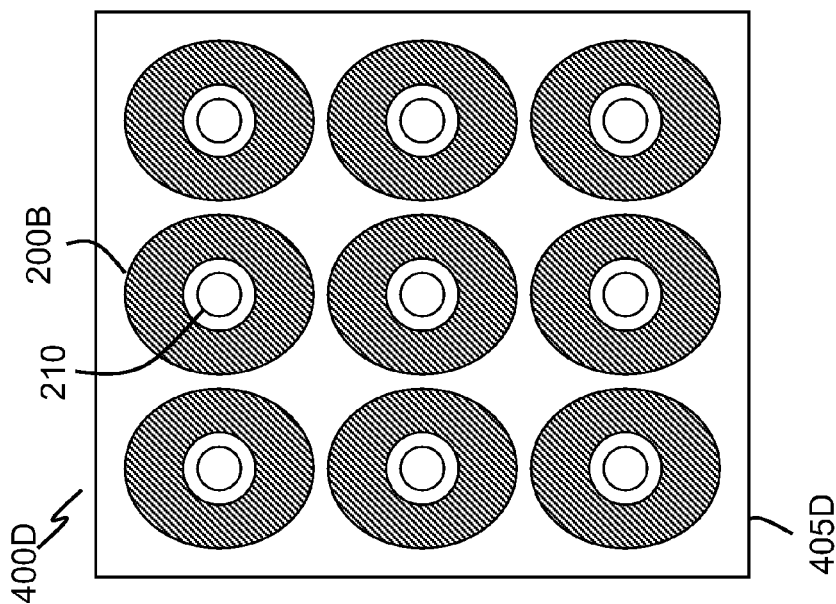

While the above description of FIG. 2C refers to the elements of the unit 200A, similar teachings with minor modifications that would be apparent to a person skilled in the art may be applicable to the unit 200B. The module 215B is rotationally symmetric with respect to rotations of all angles around the axis 255. Therefore, any cross-section of the unit 200B taken along any arbitrary plane that includes the axis 255 would look like the cross-section taken along the plane 250 shown in FIG. 2C. For each of these cross-sections, similar reasoning may be applied in analyzing how the light emitted by the LED 210 is guided in the module 215B. Such an embodiment could be particularly beneficial for areal lamps having a number of the units 200B, where e.g. 4 or 9 units 200B could be arranged in a square grid to act together as an areal light source or e.g. 6 units 200B could be arranged in a triangular grid to also act together as an areal light source, as shown in FIGS. 4D-4E and described in greater detail below.

Figure 3A:
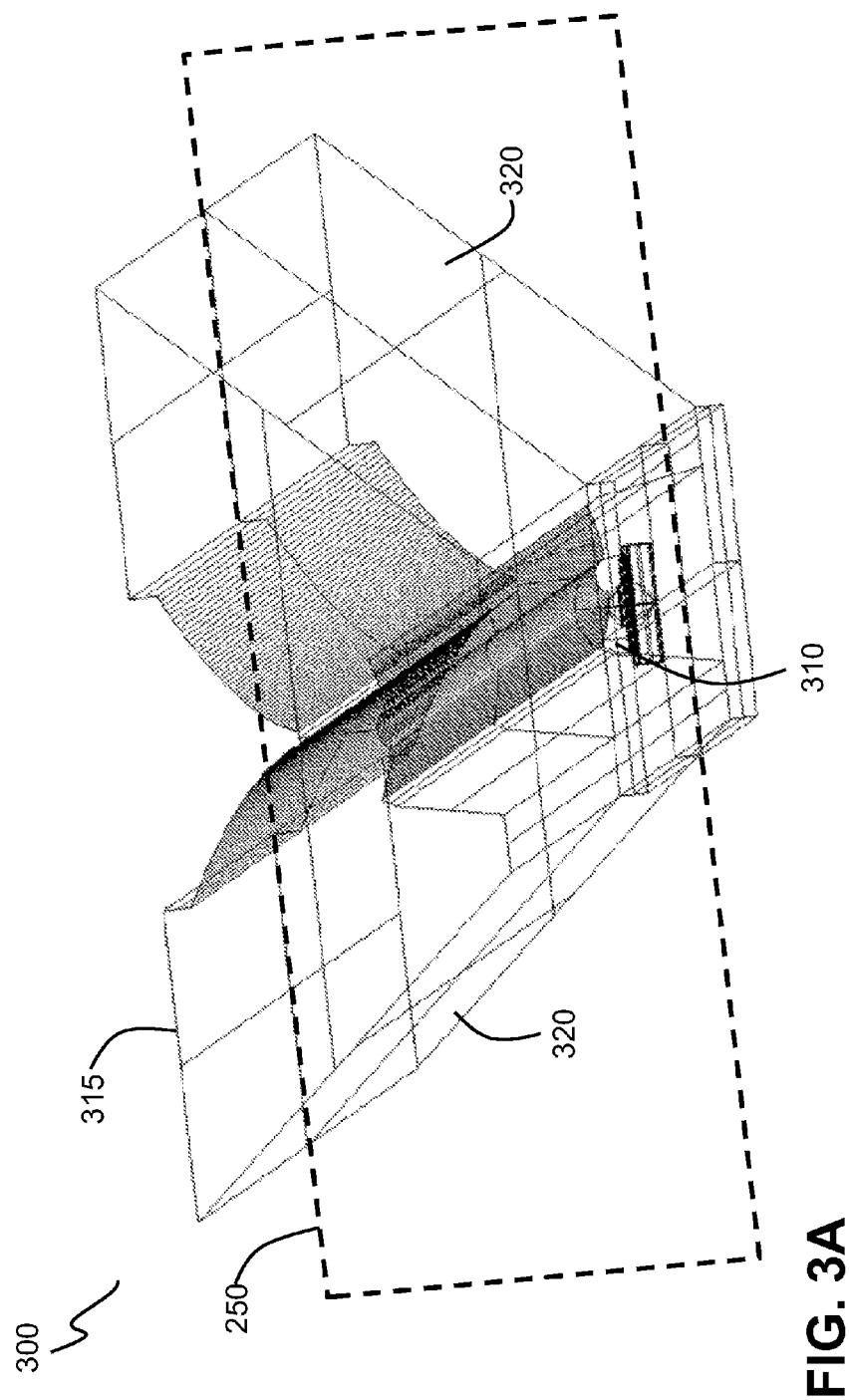
FIG. 3A illustrates a three-dimensional view of an optical unit, according to yet another embodiment of the present invention.
Figure 3B:
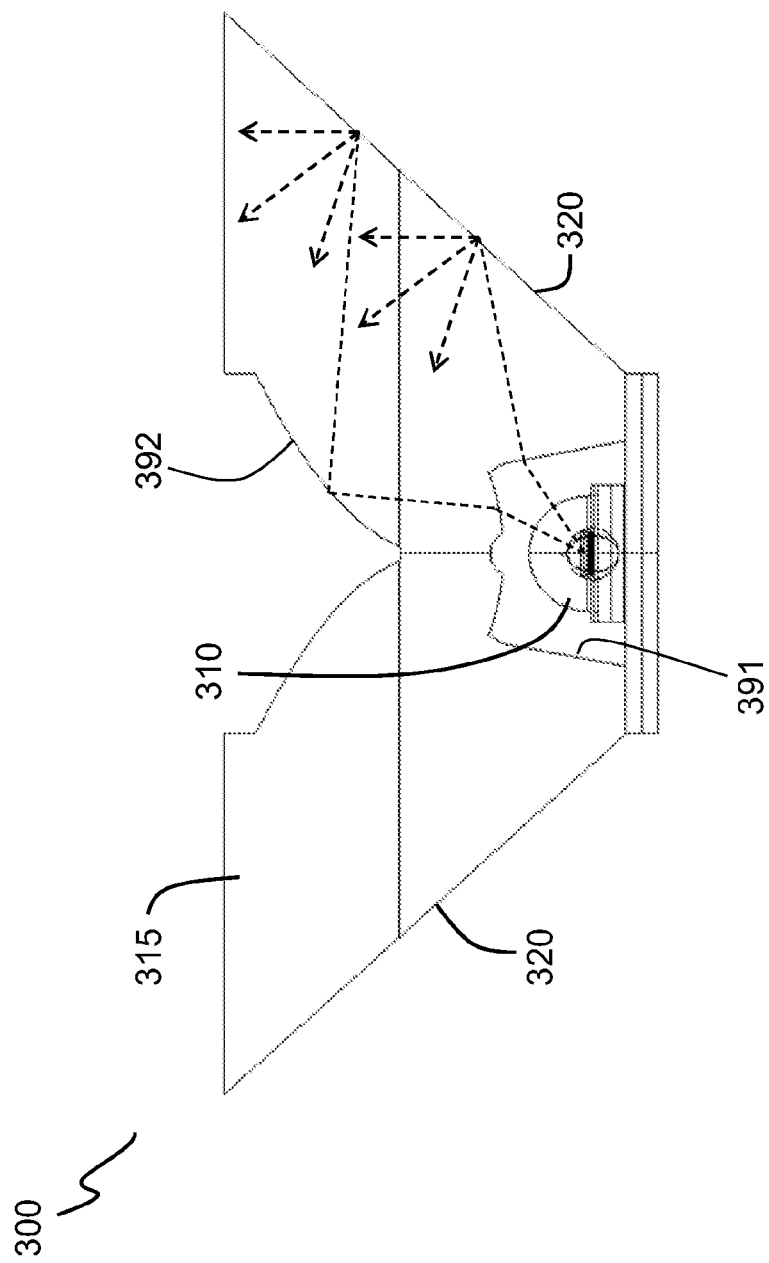
FIG. 3B illustrates a cross-sectional side view of the optical unit of FIG. 3A.

FIG. 3A illustrates a three-dimensional view of an optical unit 300, according to yet another embodiment of the present invention, and FIG. 3B illustrates a cross-sectional side view of the optical unit 300. As shown in FIGS. 3A and 3B, the unit 300 includes a LED 310 and a module 315 having diffusively reflecting surfaces 320. The LED 310 may be analogous to the LED 210, described above. Therefore, all of the discussions above with respect to the LED 210 are applicable here for the LED 310 and, in the interest of brevity, are not repeated here.

The unit 300 and the module 315 are similar to the unit 200A and the module 215A, respectively, therefore all of the discussions above with respect to the unit 200A and the module 215A are applicable here for the unit 300 and the module 315, respectively, but there are also some differences.

Figure 4F:
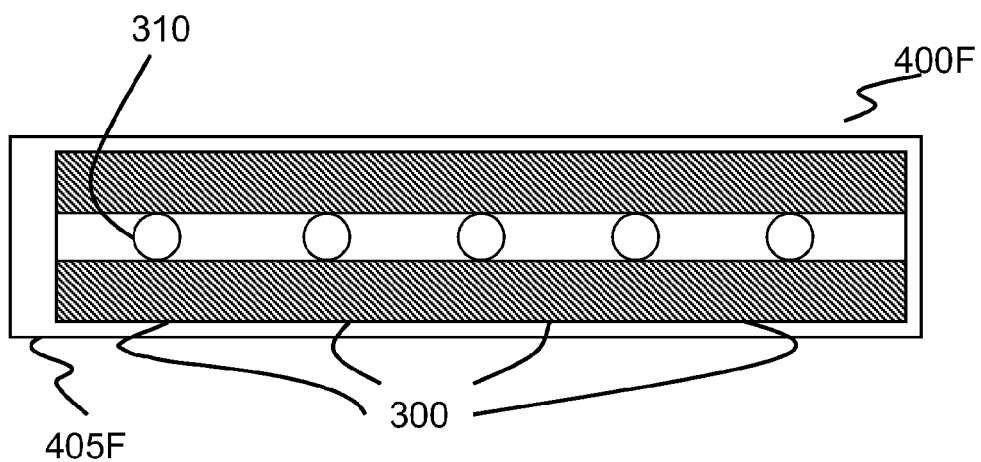
FIG. 4F illustrates an example of arranging the optical units of FIG. 3A within a lamp while employing a single monolithic module encompassing all of the LEDs, according to one embodiment of the present invention.
Figure 4G:
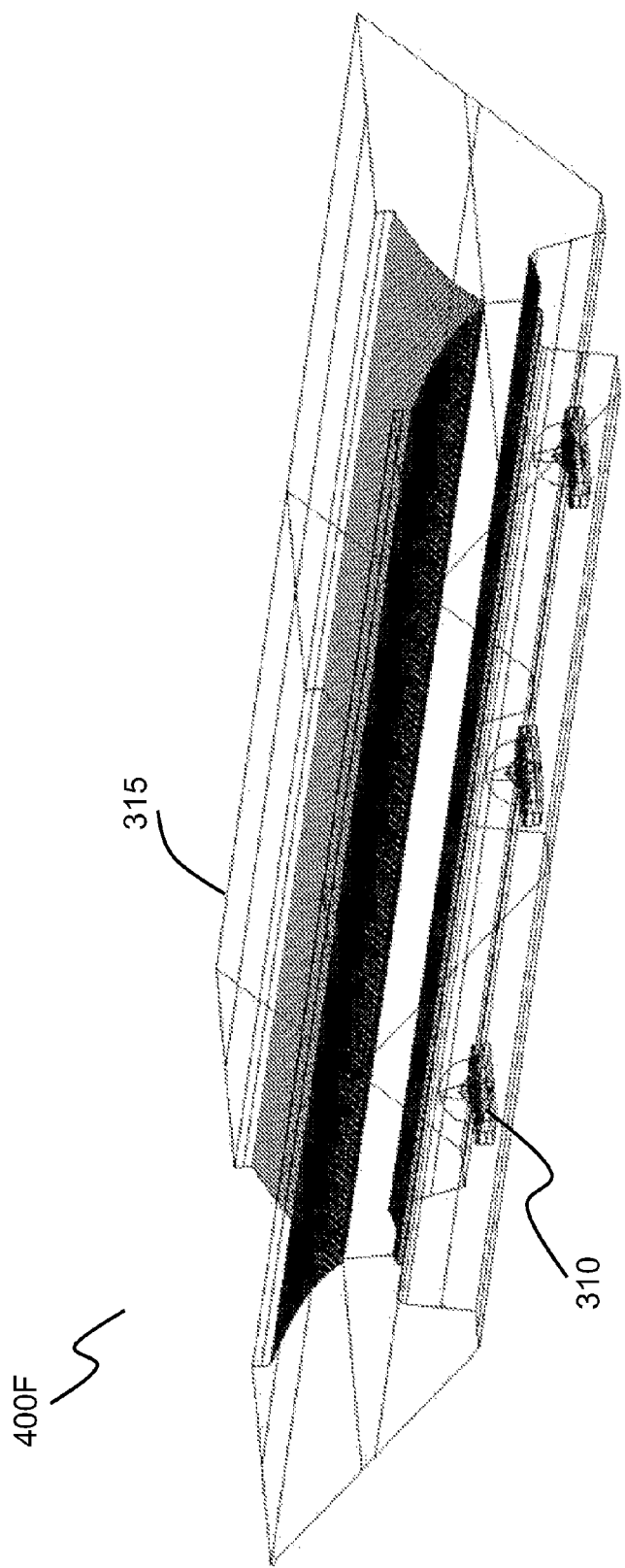
FIG. 4G illustrates a three-dimensional view of the arrangement of FIG. 4F.

One difference is that the shape of the module 315 is particularly beneficial for making linear light sources by placing a number of LEDs 310 in a row and having a single module 315 encompassing all of the LEDs 310, forming a so-called "extruded" profile as shown in FIGS. 4F and 4G with a lamp 400F, described below. Again, manufacturability may be significantly simplified and made less expensive by using an extruded profile. Note that the white diffusing side surfaces can be coextruded allowing to fabricate the optics in one continuous process. Furthermore, the optional diffusing cover could also be coextruded in the same process.

Two or more units 200A, 200B, and/or 300 described above may be employed in a lamp for e.g. providing large area illumination. FIGS. 4A and 4B illustrate some exemplary ways for arranging the optical units such as units 200A and 300 within a lamp, FIGS. 4C-4E illustrate some exemplary ways for arranging the optical units 200B within a lamp, and FIGS. 4F and 4G illustrate different views of an example of arranging the units 300 in a lamp, according to various embodiments of the present invention.

FIGS. 4A-4E provide the top view of lamps 400A-400E, respectively. As can be seen from FIGS. 2A-2C, 3A and 3B, the top profiles of the units 200A, 200B, and 300 coincide with the top profiles of the monolithic modules 215A, 215B, and 315, respectively, included therein. Therefore in FIGS. 4A-4E the monolithic modules 215A, 215B, and 315 are not identified specifically but the striped portions of the units 200A, 200B, and 300 are intended to illustrate the diffusing portions of the monolithic modules included therein.

FIG. 4A illustrates that four optical units such as the unit 200A or the unit 300 may be disposed in a row on a substrate 405A where, for each of the units, the diffusing portions are located in a transverse direction of the lamp 400A. Described differently, FIG. 4A illustrates that the long axis of each of the diffusing portions is parallel to the longitudinal direction of the lamp 400A. The units 200A or 300 arranged in this manner may together act as a linear light source. Based on symmetry considerations, the maximum luminance on the white surfaces will be in the plane 250 in FIG. 2A. As the diffusers are aligned in two uninterrupted rows, and have neighboring short sides, the configuration of FIG. 4A will more or less show the appearance of two parallel lines. Arranging the units in a line allows leakage of the light from one unit to the next, which could help evening out any color/flux difference between neighboring LEDs.

FIG. 4B illustrates that four optical units such as the unit 200A or the unit 300 may be disposed in a row on a substrate 405B where, for each of the units, the diffusing portions are located in a longitudinal direction of the lamp 400B. Described differently, FIG. 4B illustrates that the short axis of each of the diffusing portions is parallel to the longitudinal direction of the lamp 400B. The units 200A or 300 arranged in this manner may also together act as a linear light source. Based on symmetry considerations, the maximum luminance on the white surfaces would be in the plane 250 in FIG. 2A. When the diffusively reflecting surfaces would be aligned in one interrupted row with neighboring long sides, the configuration of FIG. 4B would more or less show the appearance of one line. In terms of luminance distribution, the linear direction of the line source is accentuated in such an arrangement. On the other hand, such an arrangement could also allow, if addressed individually, to switch clearly defined pixels on and off.

FIG. 4C illustrates that four optical units 200B may be disposed in a row on a substrate 405C where, for each of the units, the re-directing portion of the monolithic module is configured to guide the light emitted by the corresponding LED in all directions around the LED. The units 200B arranged in this manner may also together act as a linear light source.

FIG. 4D illustrates that nine optical units 200B may be disposed in a square grid on a substrate 405D where, for each of the units the re-directing portion of the monolithic module is configured to guide the light emitted by the corresponding LED in all directions around the LED. The units 200B arranged in this manner may together act as an areal light source.

FIG. 4E illustrates that six optical units 200B may be disposed in a triangular grid on a substrate 405E where, for each of the units the re-directing portion of the monolithic module is configured to guide the light emitted by the corresponding LED in all directions around the LED. The units 200B arranged in this manner may also act together as an areal light source.

Finally, FIG. 4F illustrates that the units 300 may be arranged in a row in a lamp 400F while employing a single module 315 encompassing all of the LEDs 310 of all of the units 300 (i.e., the extruded profile). FIG. 4G illustrates a three-dimensional view of such an arrangement. As described above, implementing an extruded profile may allow simplifying manufacturability and decreasing the overall cost of the lamp by co-extruding all of the diffusing side surfaces and an optional diffusing cover in a single continuous process.

FIGS. 4A-4G are intended to provide some schematic illustrative embodiments and persons skilled in the art will recognize that there could be many various other ways for arranging the units 200A, 200B, and/or 300 in a lamp. For example, the diffusing portions within the lamps 400A and 400B illustrated in FIGS. 4A and 4B, respectively, do not have to have a long axis and a short axis because, in other embodiments, such diffusing portions could also be square.

TIR Optics with Optimized Incoupling Structure

The optical units described above employ monolithic modules to re-direct at least a part of the light beams emitted by a LED in a substantially vertical direction to propagate in a substantially horizontal downwards or horizontal direction by reflecting the light beams incident on the outer surface of the modules by TIR. As used herein, the term "inner surface" of a monolithic module refers to surfaces 291 and 391 illustrated in FIGS. 2C and 3B, respectively, while the term "outer surface" of a monolithic module refers to surfaces 292 and 392 illustrated in FIGS. 2C and 3B, respectively.

Figure 5:
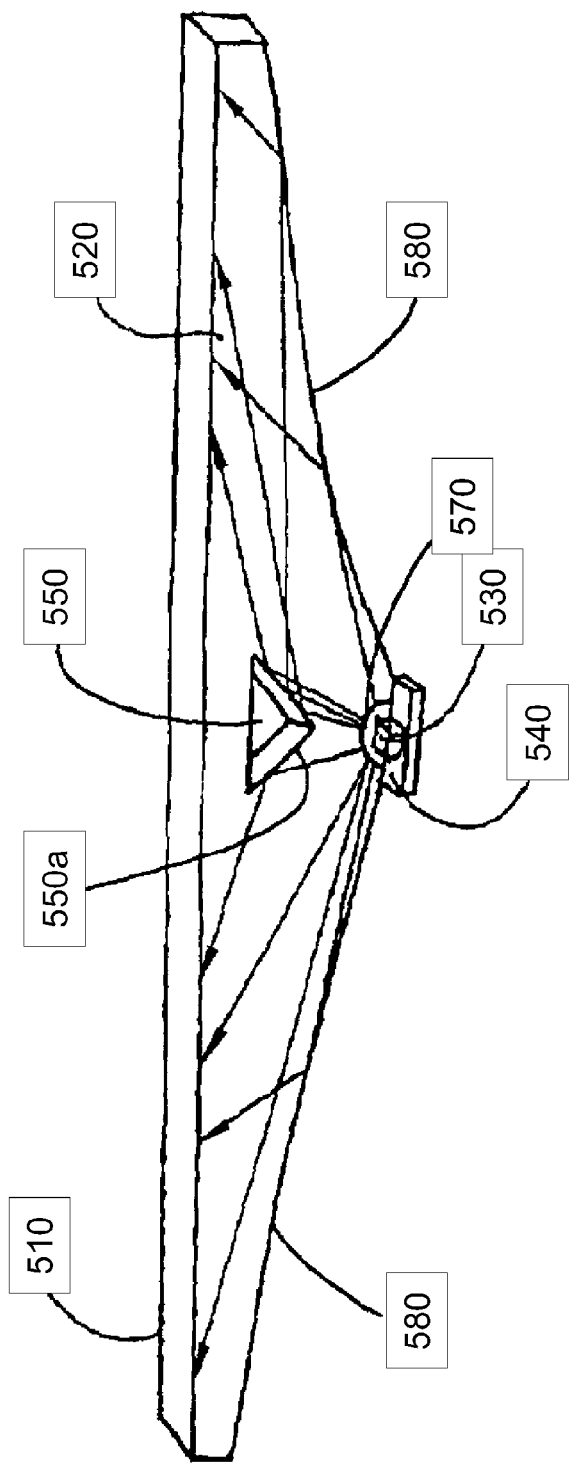
FIG. 5 illustrates a light guide according to prior art.

EP 0 945 673 A1 discloses a TIR-based light guide, illustrated in FIG. 5, for guiding the light beams emitted by a top-emitting LED in a substantially vertical direction to propagate in a horizontal and/or horizontal downwards direction. As shown in FIG. 5, a light guide 520 having a through hole 550 of an inverted triangular shape above a top-emitting LED 530 is disposed on a substrate 540. As shown in FIG. 5, the light guide 520 has a dome-shaped inner surface 570 surrounding the LED 530, a top surface 510, and a pair of opposite reflecting surfaces 580 radially extending from the inner surface 570 to form a radial reflection surface, where sides 550A of the through hole 550 are used to re-direct, by TIR, the light emitted by the LED in a longitudinal direction of the light guide.

One problem with the light guide illustrated in FIG. 5 is that the resulting structure is relatively thick, which is undesirable for applications requiring thin building height or applications where the incoupling structure is part of the light guide and where, therefore, the thickness should be limited for manufacturability reasons. In addition, no attention seems to be given to the extended size of LED's emitting surface, which, as explained below, may lead to uncontrolled light leakage from the light guide. Yet another problem is that complexity is added by the shown symmetry where additional side mirrors are required to couple light into the light guide.

Figure 6A:
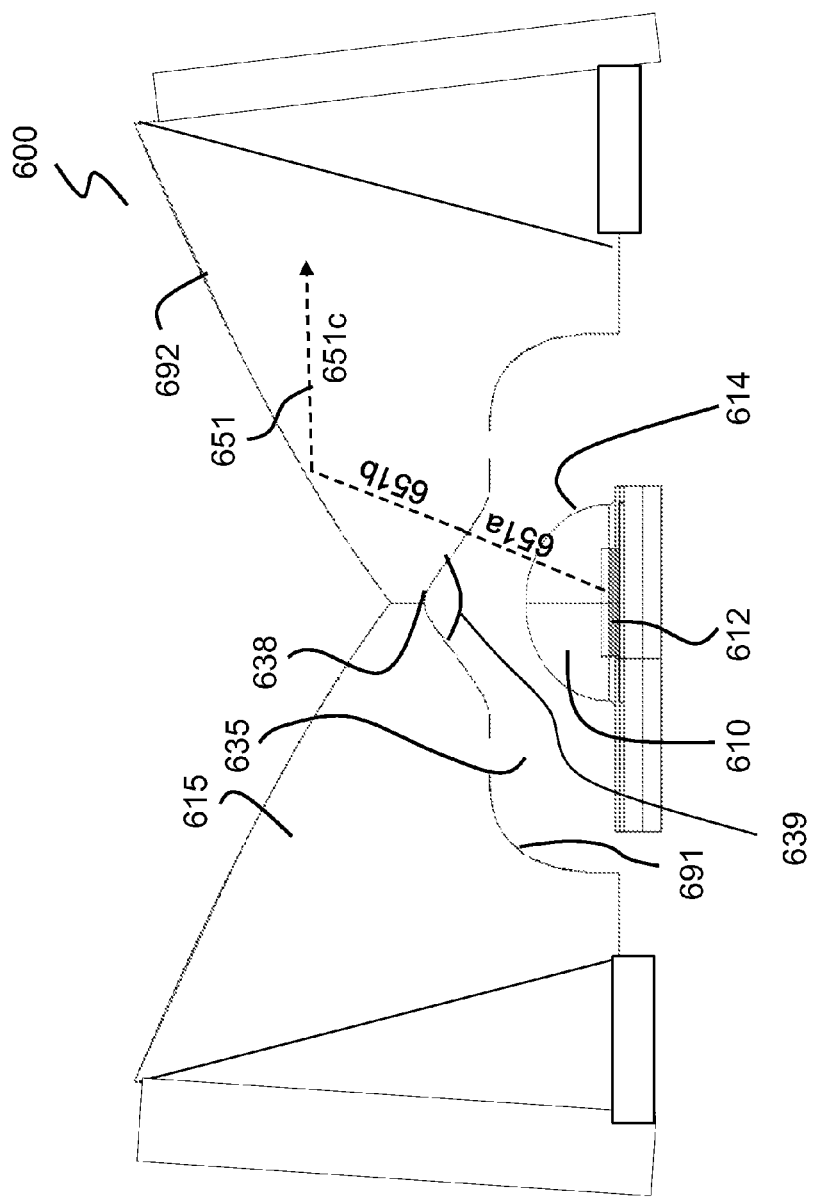
FIG. 6A illustrates a three-dimensional view of an optical unit with an optimized inner surface of a monolithic module encompassing a LED, according to an embodiment of the present invention.

Described below is an approach that helps improving on at least some of these problems by modifying the shape of an inner surface of a monolithic module encompassing a LED. Embodiments described above are particularly advantageous for top-emitting LEDs. FIG. 6A illustrates a cross-sectional side view of an optical unit 600 with a modified inner surface of a monolithic module 615, according to an embodiment of the present invention. The cross-section is taken in a symmetry plane of the optical unit 600 similar to the plane 250 of the optical units 200A and 200B shown in FIGS. 2A and 2B. Thus, the cross-sectional side view shown in FIG. 6A is similar to the cross-sectional side view shown in FIG. 2C.

Figure 6B:
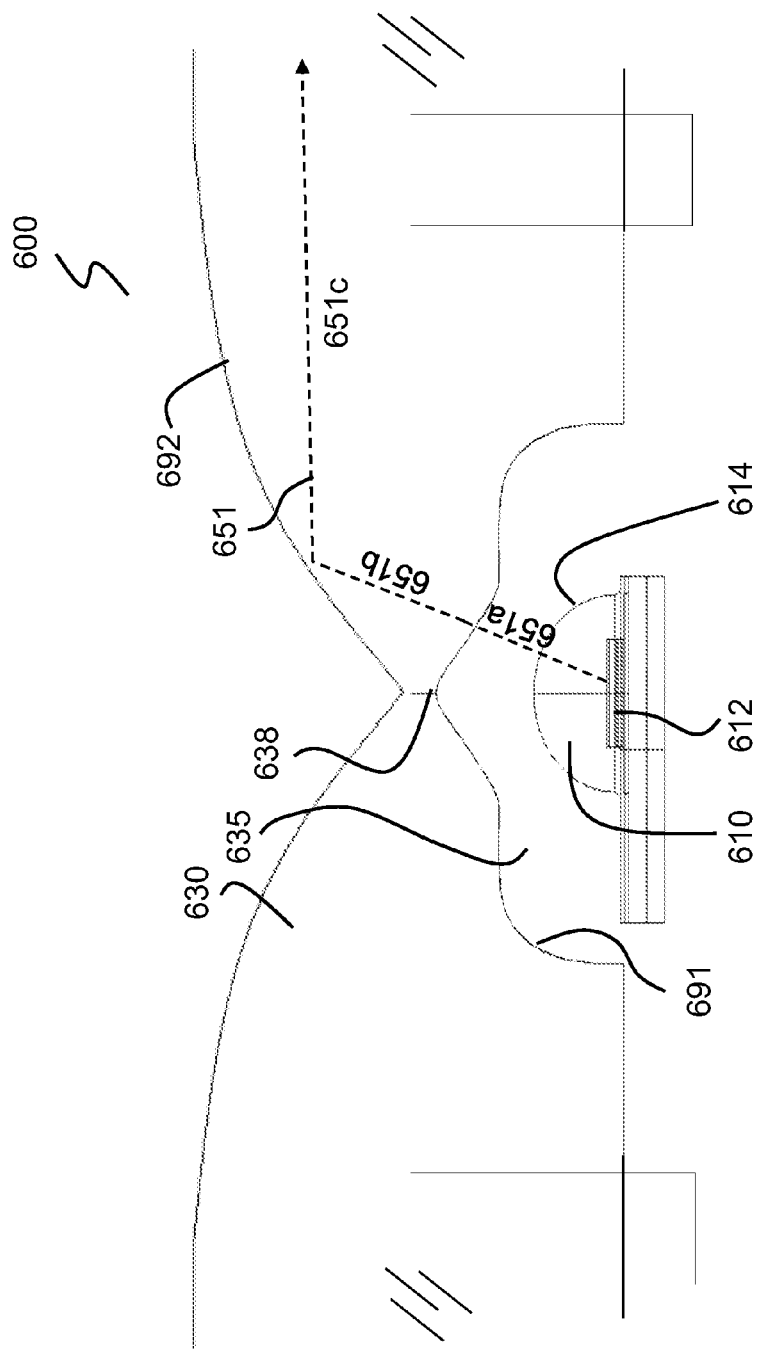
FIG. 6B illustrates a cross-sectional side view of the optical unit of FIG. 6A, according to one embodiment of the present invention.

In one embodiment, similar to the optical units 200A/200B and the optical unit 300, the optical unit 600 may be used in the lamps 400A-400F described above. In other embodiments, the module 615 can be part of a light guide, where the module would serve to couple all of the light emitted by the LED into a longer piece of transparent material guiding the light further away from the LED position, as schematically shown on FIG. 6B.

As shown in FIG. 6A, the optical unit 600 includes a LED 610 comprising a LED die 612 and a dome 614, and the monolithic module 615. The LED 610, the LED die 612, and the dome 614 may be analogous to the LED 210, the LED die 212, and the dome 214, respectively, described above. Therefore, all of the discussions above with respect to these elements are applicable here and, in the interest of brevity, are not repeated here. The module 615 also includes diffusively reflecting side surfaces 620 similar to the side surfaces 220A illustrated and described in FIGS. 2A and 2C, and therefore, all of the discussions above with respect to the diffusing side surfaces are applicable here and will not be repeated.

The module 615 comprising a body having an inner surface 691 and an outer surface 692, the inner surface 691 forming a chamber around the LED 610 is similar to the 215A, therefore all of the discussions above with respect to the module 215A are applicable here, but there are also some differences.

One difference is that, the inner surface 691 has a sharp peak 638 above the LED 610. Angle 639 illustrates an opening angle of the peak 638, described in greater detail below.

As shown in FIG. 6A with a chamber 635, in the illustrated embodiment, the inner surface 691 of the module 615 encompasses the LED 610 without being in physical contact with the LED 610. Thus, the chamber 635 is the space enclosed between the dome 614 (or the die 612, if the dome 614 is absent and the module 615 acts as "primary optics" being a part of the LED package) of the LED 610 and the module 615. Similar to the gap 235 described above, in various embodiments, the chamber 635 may be filled with air or with a material having suitable optical properties. In the latter case, this may require a different shape of the module 615.

In operation, the LED die 612 emits light in a substantially vertical direction (i.e., upwards) which is intended to be re-directed by the re-directing portion of the module 615 in a substantially horizontal and/or horizontal downwards (or backwards) direction. As used herein, the term "horizontal downwards" is used to describe the direction towards the place on which the LED die is disposed. The re-direction may be illustrated by tracing one of the light beams emitted by the LED die 612, a ray 651, shown in FIG. 6A.

As shown, the ray 651 includes three segments: 651a, 651b, and 651c. The segment 651a illustrates a segment of the ray 651 emitted by the LED die 612 before it is refracted at the boundary between the material filling the chamber 635 and the inner surface 691. Note that, while this is not illustrated in FIG. 6A in order not to clutter the drawing, the segment 651a may also be refracted at the boundary between the dome 614 and the material filling the chamber 635, depending on the refractive indices of the respective materials at the boundary. The segment 651b illustrates a segment of the ray 651 refracted at the boundary between the material filling the chamber 635 and the inner surface 691 and being incident on the outer surface 692. Finally, the segment 651c illustrates that the ray 651 is being reflected at the outer surface 692 by TIR, thus re-directing the ray 651 from propagating in a substantially vertical direction to propagate in a substantially horizontal or backward direction.

Shaping the inner surface 691 to include the peak 638 allows operation of the optical unit 600 where all of the light beams emitted by the LED die 612 that are incident on the outer surface 692 after having been refracted at the inner surface 691 may be reflected at the outer surface 692 by TIR. The resulting structure is advantageous in comparison with the structure illustrated in FIG. 5 because uncontrollable light leakage from the module 615 is significantly reduced while the overall thickness of the structure is minimized since there is no need to include holes in the module that re-direct the light, as was done in the structure of FIG. 5 and since there is no need to increase the thickness of the module 615 to the point that the LED can be considered to be a point source emitter.

The advantages of having an inner surface of a monolithic module encompassing a LED including a sharp peak above the LED and how such a shape of the inner surface may be arrived at will now be explained with reference to FIGS. 7-12. Since it is the re-directing functionality of a monolithic module similar to the module 615 that is described, such a module is in the following referred to as a "re-directing structure."

Figure 7:
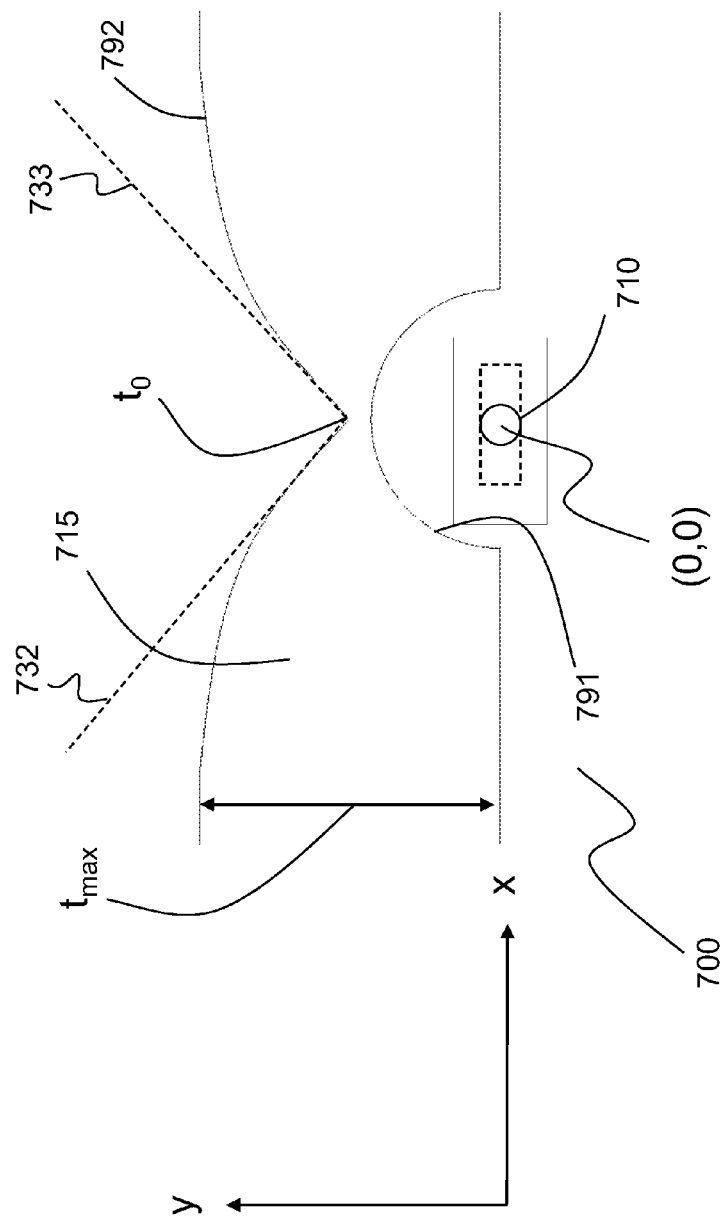
FIG. 7 provides a schematic illustration of an optical unit used in the description of FIGS. 8-12.

FIG. 7 provides a schematic illustration of an optical unit 700 used in the description of FIGS. 8-12. As shown, the optical unit 700 includes a LED 710 and a re-directing structure 715 having an inner surface 791 and an outer surface 792. In an embodiment, the LED 710 and the re-directing structure 715 could be analogous to the LED 610 and the module 615, respectively, described above and, therefore, their detailed descriptions are not repeated here.

While the inner surface 791 is shown in FIG. 7 as a dome, this is not relevant for the purpose of explaining the results shown in FIGS. 8-12 and, in fact, as explained below the shape of the inner surface 791 may be different. Similarly, while the outer surface 792 is shown to have a sandglass shape, this shape may also be different, depending on e.g. the desired radiation pattern. The inner surface 791 is merely shown to illustrate that "inner surface" is the surface of the re-directing structure 715 that partially encompasses the LED 710, while the outer surface 792 is shown to illustrate that "outer surface" is the TIR surface adapted to reflect light beams incident thereon by TIR. An angle between dashed lines 732 and 733 is referred to herein as an "embossing angle" of the re-directing structure 715.

In the discussions of FIGS. 8-12, the LED 710 is either considered to be a point source" emitter (i.e. all of the light beams emitted by the LED's die are considered to originate from a single point), which is illustrated in FIG. 7 with the LED 710 being a circle, or an "extended source" emitter (i.e., the light beams emitted by the LED's die are considered to originate not from a single point, but from different points of the emitting surface of the die), which is illustrated in FIG. 7 with the LED 710 being a dashed rectangle.

Figure 8:
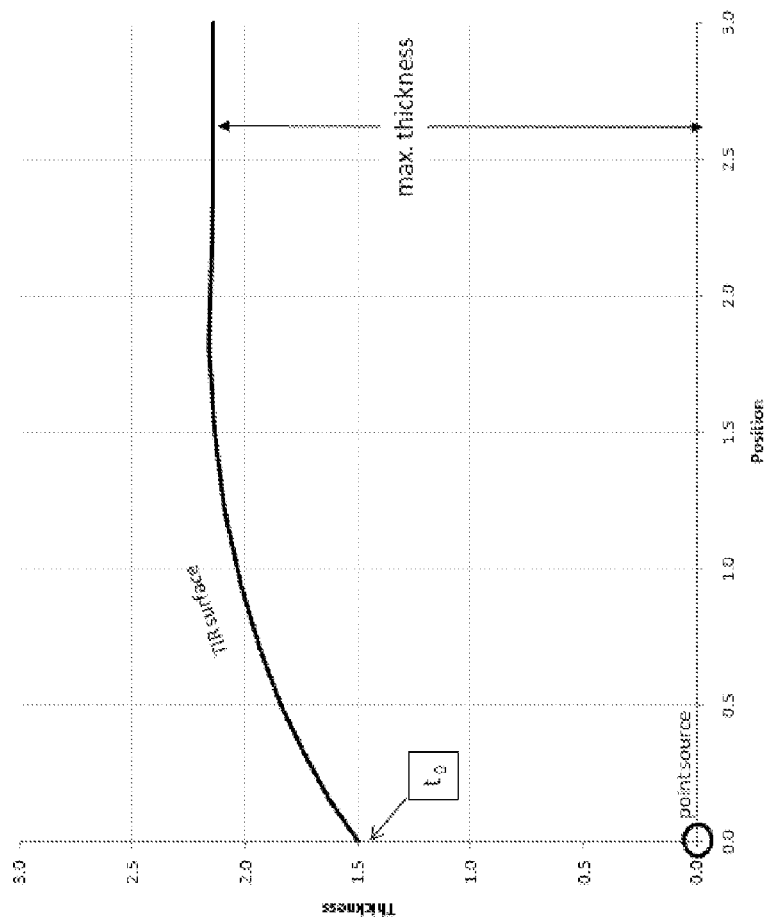
FIG. 8 provides a computation result for a cross-sectional shape of the outer surface of a re-directing structure satisfying the TIR condition when the LED is considered to be a point source emitter.
Figure 9:
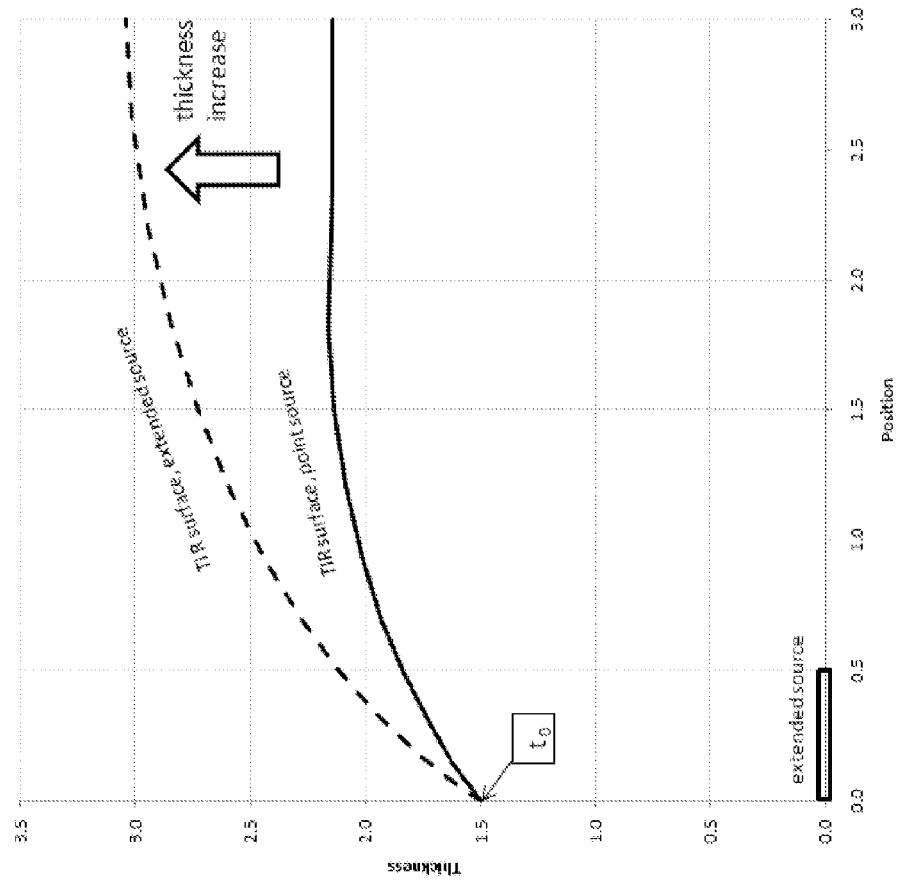
FIG. 9 provides a computation result for a cross-sectional shape of the outer surface of a re-directing structure satisfying the TIR condition when the LED is considered to be an immersed extended source emitter.

Coordinate system used in the explanations of FIGS. 8, 9, 11 and 12 is shown with the x-axis and the y-axis, where the point (0,0) of the coordinate system is considered to be at the center of the emitting surface of the LED 710 (be it a point source or an extended source emitter), the x-axis is used to indicate the position, in arbitrary units of length, and the y-axis is used to indicate thickness "t" of the re-directing structure 715, also measured in arbitrary units of length. As used herein, the term "thickness" of the re-directing structure refers to the distance from the x-axis (typically from the substrate on which the LED 710 and the re-directing structure 715 are disposed) to the outer surface 792, measured in the direction of the y-axis. Thus, thickness $t_{max}$ illustrated in FIG. 9 shows the point where the thickness of the re-direction structure 715 is at its maximum (thickness=max. thickness) and thickness $t_0$ illustrated in FIG. 9 shows the thickness of the re-directing structure 715 at its minimum, referred to herein as a "starting thickness" of a re-directing structure. For the sandglass-shaped re-directing structure illustrated in FIG. 9, the starting thickness happens to be measured along the axis of symmetry of the beam pattern of the LED 710 (i.e., above the center of the LED 710). The starting thickness may be given by e.g. the height of the LED chamber (i.e., the height of the dome 914 encompassing the LED die 912) and the minimum material thickness of the material of the re-directing structure 715 which has the necessary mechanical characteristics or is given by manufacturing reasons.

Note that, as used herein, the word "maximum" in the term "maximum thickness" refers to the thickness of the re-directing structure being at its maximum and that the "maximum thickness" is actually the minimum value of the thickness of the re-directing structure that would allow all light beams incident on the outer surface 792 to be reflected with TIR.

Using Snell's law and light propagation laws, a set of appropriate trigonometric equations can be established describing the ray paths of light emitted at different angles from different spots on the emitting surface of the LED travelling to the boundaries formed by the inner and outer surfaces of the re-directing structure. Including information regarding refractive indices of the materials on different sides of the boundaries formed by the inner and outer surfaces and information regarding the shape of the inner surface in a manner known in the art, a shape of the outer surface 792 may be determined that would allow all of the light beams incident on the outer surface 792 to be reflected via TIR.

In the following discussions, the re-directing structure 715 is assumed to be made of a material having a refractive index n and to be surrounded by air (i.e., surrounded by a material having a refractive index equal to 1).

To calculate the outer surface just fulfilling the TIR conditions, starting point will be above the center of the LED 710. When the refractive index of the re-directing structure 715 is equal to 1.49 (e.g. the re-directing structure 715 is made from PMMA) and the LED 710 is considered to be a point source emitter, the embossing angle of the hourglass arrangement could be calculated to be equal to 95.7 degrees. The next coordinate points (x,y) of the outer surface can be calculated from $$y(x)=t_0+\int_0^x \tan(\theta_{TIR}-\beta_{Ray})dx \quad (1)$$

In equation (1), $t_0$ represents the starting thickness of the re-directing structure 715, $\theta_{TIR}$ is the minimum incident angle to fulfill TIR condition and $\beta_{Ray}$ is the emission angle from the LED 710. For a point source located at (0,0), $\beta_{Ray}$ is directly linked to the coordinates of the outer surface and the equation of the outer surface becomes:

$$y(x) = t_0 + \int_0^x \tan\left(\theta_{TIR} - \arctan\left(\frac{x}{y}\right)\right)dx \quad (2)$$

FIG. 8 provides a computation result of the cross-section (x, y(x)) of such a shape of the outer surface 792 satisfying the TIR condition when the LED 710 is considered to be a point source emitter. In the simulation of FIG. 8, the re-directing structure 715 is such that the inner surface 791 forms a dome chamber encompassing the LED 710 or such that the LED 710 is immersed within the re-directing structure 715. As used herein, the term "immersed" is used to describe an embodiment where the inner surface 791 is in direct contact with the LED 710. As becomes clear from the inspection of the simulation result of FIG. 10, in this case, the outer surface 792 could as well be chosen to be essentially a parabola (with a minimum height to satisfy TIR condition) if the resulting light beam pattern after re-direction is meant to be essentially collimated.

The thinnest re-directing structure 715 above back plane based on the TIR condition (see equation (2) above), with starting thickness $t_0$ above the center of the LED 710, will have as maximum thickness of the re-directing structure 715:

$$\text{max. thickness}=t_0 e^{k\cdot\pi/2} \quad (3)$$

where $k=\sqrt{1/(n^2-1)}$

However, the LED 710 cannot always be considered to be a point source emitter. This consideration becomes especially important when the size of the emitting surface of the LED 710 is comparable with the starting thickness of the re-directing structure 715. For a LED 710 with a given size of the emitting surface (source_size), at a height h above the center of the LED 710 the incident angles (on the outer surface 792) from the emitting surface will be distributed between $$\pm \arctan\left(\frac{source\_size}{2h}\right),$$

which, at a height equal to the size of the emitting surface, will lead to emitting angles being distributed from −26 degrees to +26 degrees above the center of the LED 710. This means that the embossing angle of the re-directing structure 715 would decrease to 55 degrees (for the re-directing structure 715 made from PMMA) to satisfy the TIR condition. As can already be made clear from a simple geometrical inspection of the relationship between the embossing angle and the maximum thickness of the re-directing structure 715 illustrated in FIG. 7, the smaller the embossing angle, the greater the maximum thickness of the re-directing structure 715. Thus, a decreased embossing angle leads to a significantly increased thickness of the re-directing structure 715 for the TIR condition to still be satisfied. Equation (2) would be changed here to include the extended source emission position to $$y(x) = t_0 + \int_0^x \tan\left(\theta_{TIR} - \arctan\left(\frac{x - source\ size/2}{y}\right)\right) dx \quad (4)$$

This case is illustrated in FIG. 9, providing a computation result for a cross-sectional shape of the outer surface 792 satisfying the TIR condition when the LED 710 is considered to be an immersed extended source emitter (the dashed line in FIG. 9). For comparison, the simulation result of FIG. 8 (i.e., the LED 710 is considered to be a point source emitter) is also included in FIG. 9 (the solid line in FIG. 9).

When the LED 710 is considered to be immersed within the re-directing structure 715, the solution for the maximum thickness of the re-directing structure 715 can still be written analytically, showing the dependence on source size and optics' size:

$$max \cdot thickness = \frac{t_0}{\sin\left(\frac{\pi}{2} - \arctan\left(\frac{source\ size}{t_0}\right)\right) e^{k\left(\frac{\pi}{2} - \arctan\left(\frac{source\ size}{t_0}\right)\right)}} \quad (5)$$

FIG. 9 illustrates that when only the outer surface 792 of the re-directing structure 715 is optimized to make sure that all light beams incident on the outer surface 792 are reflected by TIR, thickness of the re-directing structure 715 has to increase when the size of the emitting surface of the LED 710 is such that the LED 710 may no longer be considered to be a point source emitter. Just how big should the size of the emitting surface of the LED 710 be when it may no longer be considered to be a point source emitter is illustrated in FIG. 10.

Figure 10:
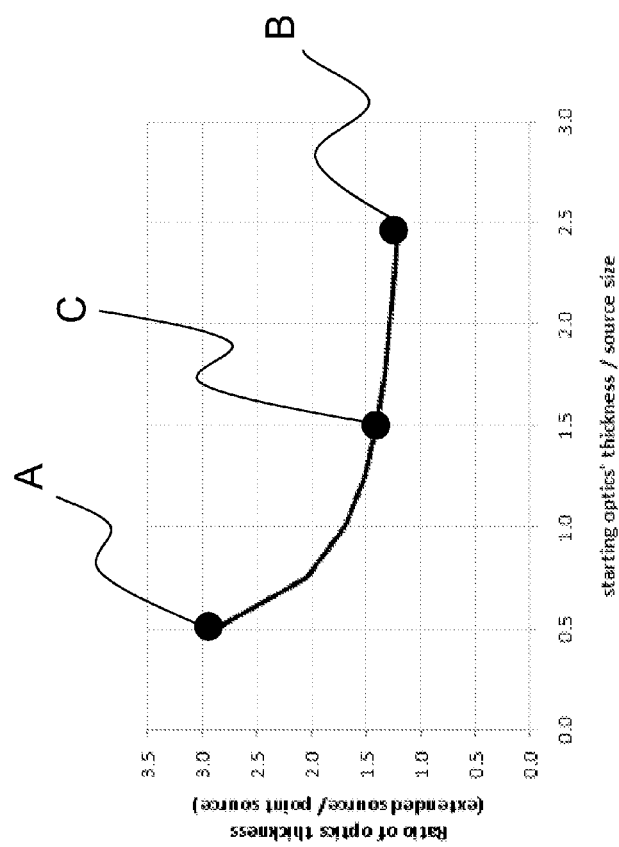
FIG. 10 illustrates dependence of the optics size on the size of the emitting surface of the LED for the above-described re-direction structures satisfying the TIR condition.

FIG. 10 illustrates dependence of the optics size on the size of the emitting surface of the LED 710, where the term "optics' thickness" refers to the maximum thickness of the re-directing structure 715. The x-axis in FIG. 10 is used to indicate the ratio between the starting thickness of the re-directing structure 715 (i.e., $t_0$) and the size of the emitting surface of the LED 710, while the y-axis is used to indicate the ratio between the maximum thickness of the re-directing structure 715 when the LED 710 is considered to be an extended source emitter and the maximum thickness of the re-directing structure 715 when the LED 710 is considered to be a point source emitter (i.e., the ratio between values calculated according to equation (5) and equation (3) provided above).

Point A in FIG. 10 illustrates that when the size of the emitting surface is approximately twice as large as the starting thickness of the re-directing structure 715 (i.e., the ratio depicted along the x-axis of FIG. 10 is equal to 0.5), the maximum thickness of the re-directing structure increases approximately 3 times compared with the maximum thickness necessary to satisfy TIR condition when the LED 710 can be considered to be a point source emitter. This means that when the ratio $t_0$/source_size is equal to 0.5, the re-directing structure 715 having a maximum thickness less than the value calculated according to equation (5), provided above, will not be able to satisfy TIR condition for all of the incident angles and some of the light will be leaked out.

FIG. 10 further illustrates that when the starting thickness of the re-directing structure 715 is increased with respect to the size of the emitting surface of the LED 710, the ratio between the optics size for the extended source and a point source emitter decreases. Thus, as shown in FIG. 10 with a point B, when the starting thickness of the re-directing structure 715 is 2.5 times bigger than the size of the emitting surface of the LED 710, the maximum thickness of the re-directing structure only needs to be increased approximately 1.25 times to satisfy the TIR condition in comparison with maximum thickness when the LED 710 could be considered a point source.

Point C in FIG. 10 corresponds to the scenarios depicted in FIG. 9 where the ratio between the starting optics' thickness and the source size is equal to 1.5 because in FIG. 9, $t_0$ is shown to be equal to 1.5 units of length while the half of the extended source is shown to be equal to 0.5 units of length. FIG. 9 illustrates only a half of the extended source since, as described above, point (0,0) coincides with the center of an LED. As illustrated in FIG. 10 with point C, for such a ratio between the starting optics' thickness and the source size, the ratio between optics' thickness calculated for the extended source and for the point source is a little bit less than 1.5. This is also clear from comparing, in FIG. 9, the maximum thickness of the dashed line and the maximum thickness of the solid line.

Figure 11:
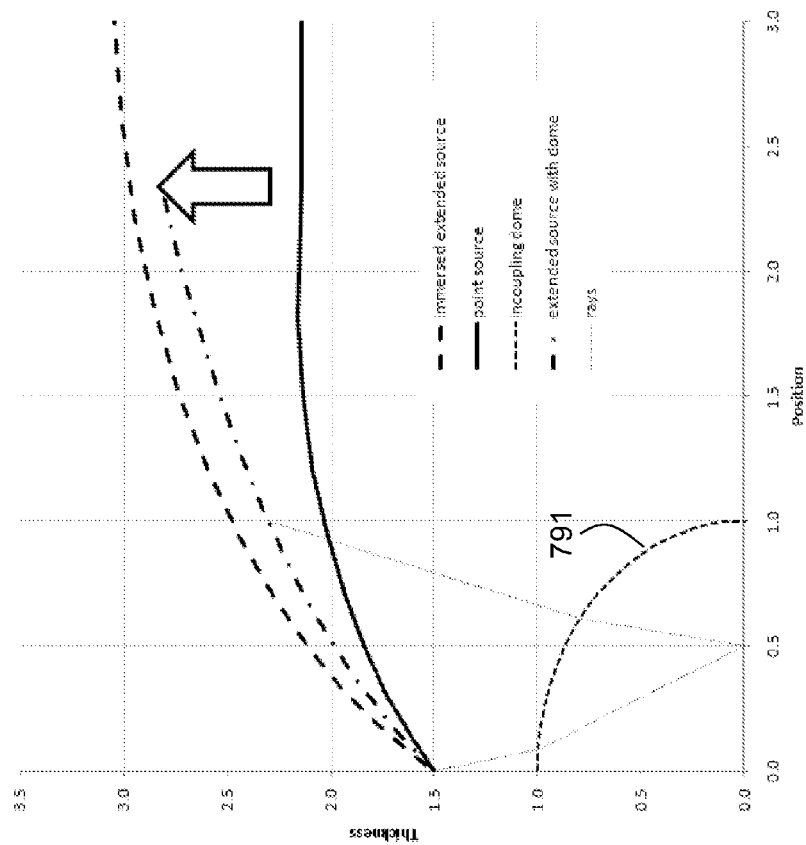
FIG. 11 provides a comparison of the computation results for a cross-sectional shape of the outer surface of a re-directing structure satisfying the TIR condition when the LED is considered to be a point source emitter, or an immersed extended source or an extended source encompassed by a dome-shaped inner surface of the re-directing structure.

Based on FIG. 10, it can be concluded that when the re-directing structure 715 is made thick enough, any LED 710 may be considered to be a point source and shape of the outer surface 792 may be determined so that TIR condition would be satisfied for all light beams incident thereon. However, as described in the background section, it may be desirable to make the re-directing structure 715 as thin as possible. To that end, employing a dome-shaped inner surface 791 (i.e., the inner surface 791 shaped so as to form a dome around the LED 710) allows decreasing the overall thickness of the re-directing structure 715, in comparison with the immersed LED described in FIG. 9, while still satisfying the TIR condition. This is illustrated in FIG. 11, providing a simulation result for a cross-sectional shape of the outer surface 792 satisfying the TIR condition when the LED 710 is considered to be an extended source emitter with the inner surface 791 forming a dome chamber encompassing the LED 710 (the dotted-dashed line in FIG. 11). For comparison, the simulation results of FIG. 8 (i.e., the LED 710 is considered to be a point source emitter) and FIG. 9 (i.e., the LED 710 is considered to be an extended source emitter) are also included in FIG. 11 (the solid line and the dashed line, respectively, in FIG. 11).

When the LED 710 is considered to be encompassed by a dome-shaped inner surface 791, the solution for the maximum thickness of the re-directing structure 715 can no longer be written analytically. Instead, the equation for the outer surface 792 that would satisfy TIR condition for all incident beams, given the dome shape of the inner surface 791 needs to be solved numerically, which would read:

$$y(x) = t_0 + \int_0^x \tan\left(\theta_{TIR} - \arctan\left(\frac{x - x_c}{y - y_c}\right)\right)dx \quad (6)$$

In equation (6), $(x_c, y_c)$ are the coordinates of the ray's intersection with the dome interface before being incident on the outer surface in (x, y).

As is clear from FIG. 11, employing a dome-shaped inner surface 791 allows decreasing the overall thickness of the re-directing structure 715 compared to the necessary minimum thickness for the immersed extended source scenario (dashed line in FIG. 11) but the overall thickness is still significantly greater than that for the point sources scenario (solid line in FIG. 11). Only by shaping the inner surface 791 beyond a dome shape, that is, by creating a peak above the LED 710, can the light beams be sufficiently refracted at the inner surface boundary to be reflected by TIR at the outer surface 792, without uncontrolled leakage and with minimum increase in the thickness of the re-directing structure 715. When the inner surface 791 is shaped as shown in FIG. 6A (such a surface may be referred to as 'peak-shaped' surface), then the numerical simulation similar to those shown in FIG. 11 would yield a shape of the outer surface 792 closest to the shape of the outer surface 792 for the point source scenario, i.e., with the minimum overall thickness of the re-directing structure 715.

Similar to the dome-shaped inner surface, the solution for the maximum thickness of the re-directing structure 715 for the peak-shaped inner surface 791 cannot be written analytically, but may be obtained as a numerical solution.

To calculate the shape of the inner chamber, the inner surface's slope should be oriented so as to "rotate" the rays emitted from the edge of the source's surface into the direction of rays coming from the center (as the outer TIR surface was originally designed on that point). In other words, the inner surface slope should be oriented so that the rays emitted from the edge of the source's emitting surface would be refracted by the inner surface at such an angle that it would appear as if they were emitted from the center of the source's emitting surface. As used herein, the term "rotation" in the context of "rotation" of the rays emitted from the edge of the emitting surface is used to describe the change in the direction of such rays after they are refracted at the boundary with the inner surface due to the change in the shape of the inner surface.

The corresponding equation then becomes $$n\sin(\alpha_{inner}(x_{inner}, y_{inner}) - \alpha_{target}(x_{inner}, y_{inner})) = \quad (7)$$
$$\sin\left(\arctan\left(\frac{\text{source size}/2 - x_{inner}}{y_{inner}}\right) + \alpha_{inner}(x_{inner}, y_{inner})\right)$$

In equation (7), $\alpha_{inner}$ is the angle that the slope of the inner interface at coordinates $(x_{inner}, y_{inner})$ forms with the x-axis, $\alpha_{target}$ is the target angle (i.e., angle as defined by rays emitted from the center position of the source) of the source's edge ray in the medium of refractive index n. The shape of the inner surface can then be integrated as $$y_{inner}(x_{inner}) = y_0 - \int_0^{x_{inner}} \cot(\alpha_{inner}(x_{inner}, y_{inner}))dx \quad (8)$$

In equation (8), $y_0$ is the starting height of the inner chamber above the center of the LED for the two-sided type redirecting structures as described here (i.e., the distance, measured in the direction of the y-axis, from the x axis to the peak of the inner chamber, such as the peak 638). Note that, depending on the total source size/optics thickness ratio, when approaching the edge of the source, the slope increases such that the chamber will be reduced to zero thickness. To avoid this, the slope could be chosen smaller than necessary and the outer surface would need to be modified, leading to a slightly thicker solution of the optics. The thickness increase is, however, much less than with a dome-shaped inner surface, as the starting slope of the outer surface, above the center of the source, has been reduced significantly.

Figure 12:
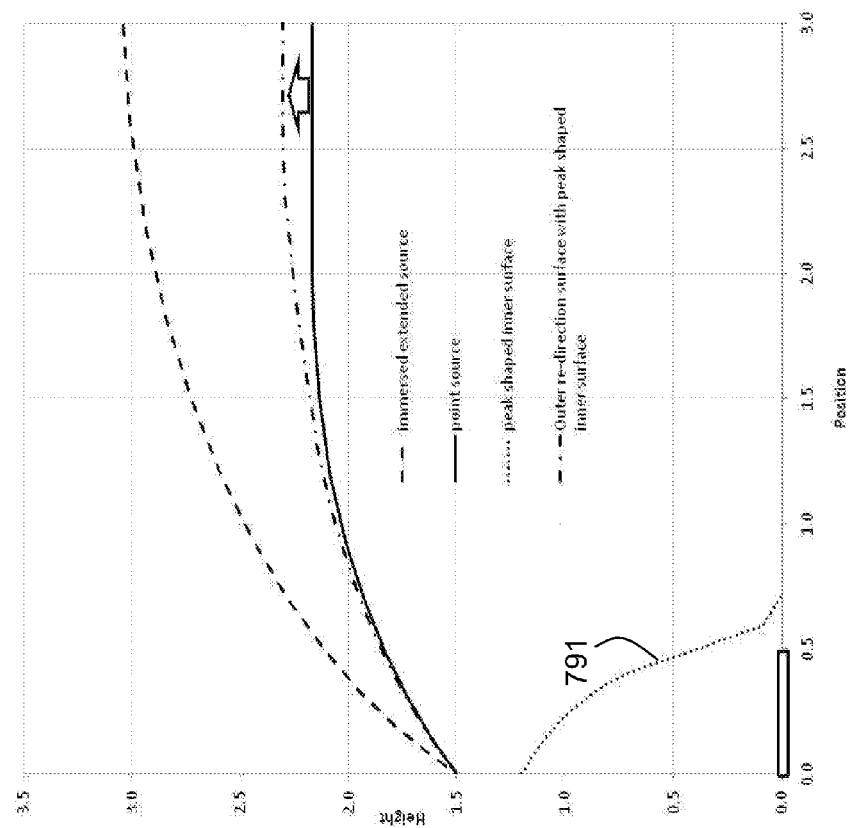
FIG. 12 provides a comparison of the computation results for the different cross-sections of the minimum thickness TIR re-directing structures with different incoupling chambers.

This is illustrated in FIG. 12, providing simulation result of the cross-sectional shape of the outer surface 792 satisfying the TIR condition when the LED 710 is considered to be an extended source emitter with the inner surface 791 forming a peak shaped chamber encompassing the LED 710 (the dotted-dashed line in FIG. 12, solution to the equations (7) and (8)). For comparison, the simulation results of FIG. 8 (i.e., the LED 710 is considered to be a point source emitter) and FIG. 9 (i.e., the LED 710 is considered to be an extended source emitter) are also included in FIG. 12 (the solid line and the dashed line, respectively, in FIG. 12). This numerical simulation yields thus a shape of the outer surface 792 closest to the shape of the outer surface 792 for the point source scenario, i.e., with the minimum overall thickness of the re-directing structure 715.

Persons skilled in the art will recognize that, depending on e.g. the final radiation pattern and mechanical constraints, the re-directing structure can be described by shapes different than the shapes illustrated in the exemplary embodiments herein. However, irrespective of the particular shape of the re-directing structure, reducing the otherwise steep embossing angle in the center above the LED is the most important consideration for the final thickness of the re-directing structure, when the LED is considered to be an extended source. The peak-shaped inner surface contributes efficiently to this reduction by "rotating" the incoming rays from the edge of the source into a direction that more easily can fulfill the TIR condition at the outer surface of the re-directing structure. The peak-shaped inner surface should have an average opening angle (such as e.g. the opening angle 639 illustrated in FIG. 6A) so that, in a cross-sectional view like the one shown in FIG. 6A, a straight line drawn between the peak 638 and the edge of the LED die 612 would not cross the inner surface 691. For a starting height $y_0$ of the inner surface this condition reads:

opening angle=$2\alpha_{inner}(0, y_0)$=2 a tan(source size/2/$y_0$)

Further, to allow the "rotation" of the beam emitting from the edge of the source, the angle of the inner surface will be in the center for an inner surface starting height equal to the source size and for refractive index of n=1.49:

$2\alpha_{inner}(0, \text{source size})$=74 degrees (instead of 180 degrees as given for a dome shaped solution).

Figure 16:
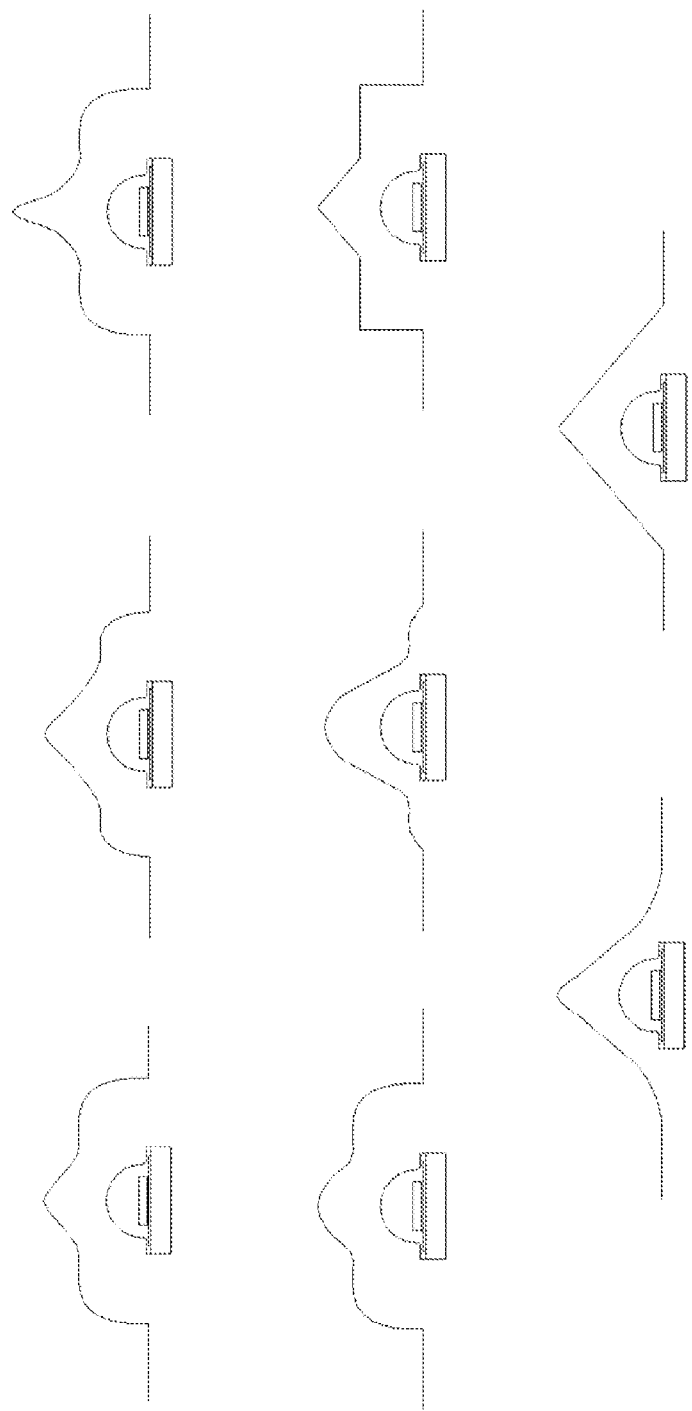
FIG. 16 illustrates inner surfaces comprising peaks of different shapes, according to various embodiments of the present invention.

In practice, when a re-directing structure is manufactured by e.g. injection moulding, it could happen that the peak in the inner surface instead of being a sharp peak with an opening angle designed as described above is actually rounded on the very top (as shown in some exemplary structures illustrated in FIG. 16). In such a case the opening angle could be, in reality, equal to 180 degrees (because the peak itself forms a dome at the center of the inner surface of the re-directing structure). However, persons skilled in the art would still recognize that how to apply the teachings disclosed in the present invention regarding introducing an appropriate peak to the inner surface of a re-directing structure even when the peak is, in practice, rounded.

A second part of the inner surface can rather be given by mechanical constraint and minimum Fresnel reflection for rays already emitted from the LEDs in the final target direction. With these starting points in mind, optical raytracing software may be employed to find the overall compromise.

Figure 13A:
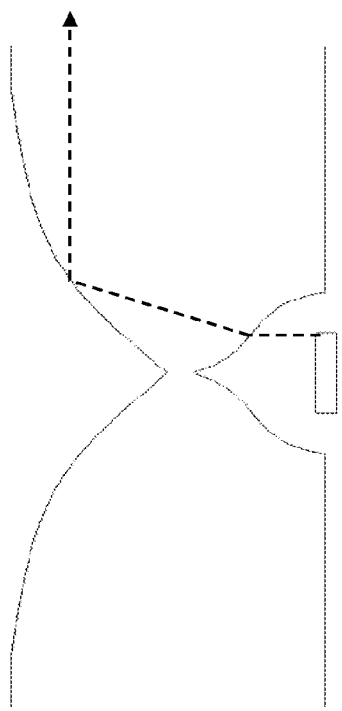
FIGS. 13A-13D illustrate differences with respect to light leakage between a re-directing structure forming a dome chamber around a LED and a re-directing structure according to an embodiment of the present invention forming a chamber having a sharp peak above the LED.
Figure 13B:
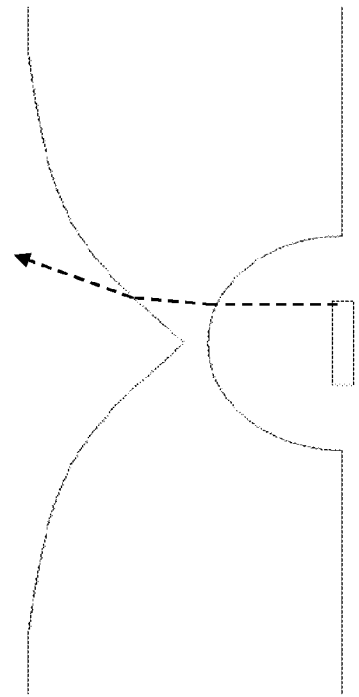
Figure 13C:
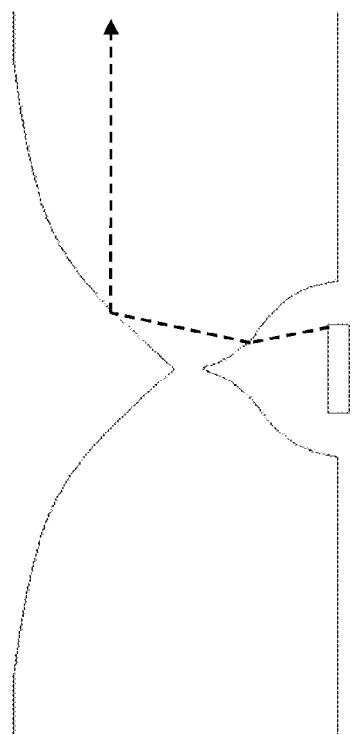
Figure 13D:
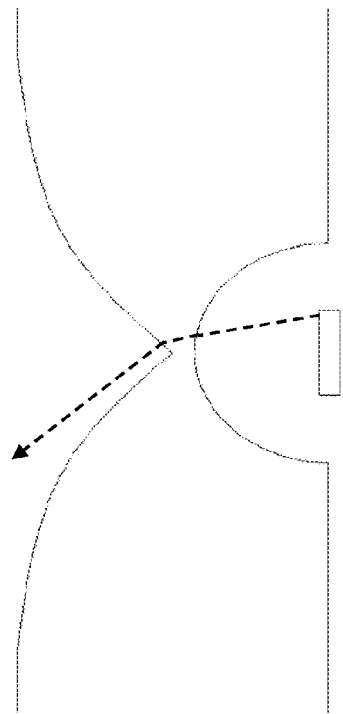

FIGS. 13A-13D illustrate how, given the same maximum thickness and the same starting thickness of the re-directing structure 715 and the same shape of the outer surface 792, light beams emitted from near the edge of the emitting surface of the LED 710 could be leaked out when a dome-shaped inner surface 791 is employed (see FIGS. 13B and 13D). In contrast, when a peak-shaped inner surface 791 is employed, the same light beams would be reflected at the outer surface 792 by TIR (see FIGS. 13A and 13C). Thus, shaping the inner surface 791 with respect to the outer surface 792 allows achieving that all of the light beams refracted at the inner surface 791 and incident on the outer surface 792 are reflected at the outer surface 792 by TIR.

Figure 14:
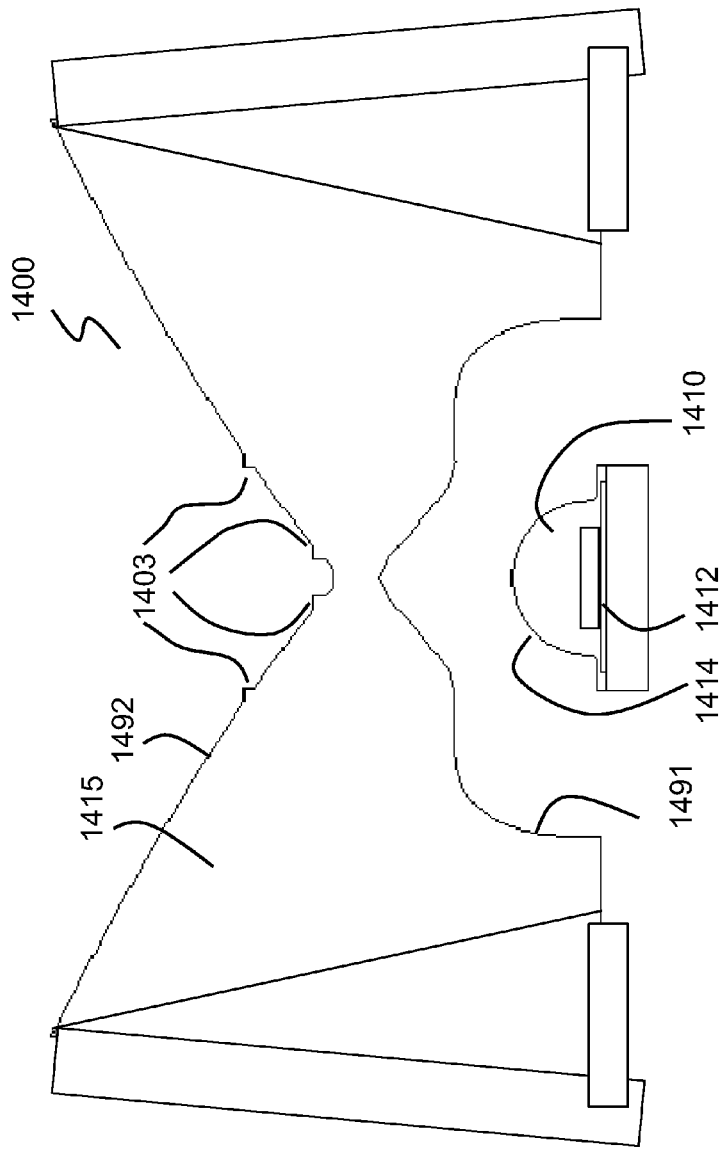
FIG. 14 illustrates a cross-sectional side view in the plane 650 of an optical unit with controlled light leakage, according to one embodiment of the present invention.
Figure 15:
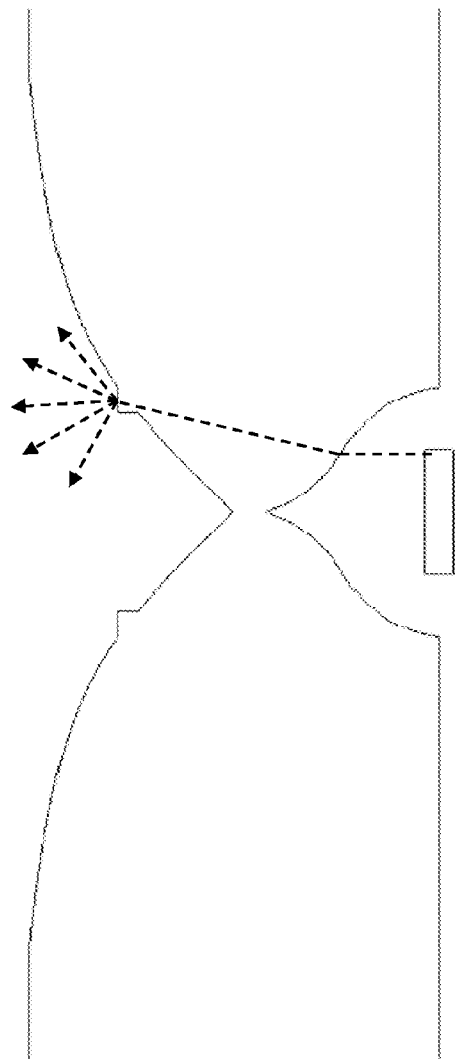
FIG. 15 illustrates a cross-sectional side view in the plane 650 of an optical unit with controlled light leakage, according to another embodiment of the present invention.

Returning back to the optical unit illustrated in FIG. 6A, for applications that require that some of the light is leaked out of the optical unit 600, additional structures may be introduced to the module 615 that allow controlled light leakage in pre-determined locations with respect to the LED 610, according to one embodiment of the present invention. To that end, FIG. 14 illustrates a cross-sectional side view in the plane 250 of an optical unit 1400, which is similar to the optical unit 600. The optical unit 1400 includes a LED 1410 and a monolithic module 1415, similar to the LED 610 and the module 615, respectively, described above. Therefore, in the interests of brevity, a description of the LED 1410 and the module 1430 is not repeated here. The main difference between the optical unit 600 depicted in FIG. 6A and the optical unit 1400 is that the latter also includes rings 1403 on an outer surface 1492 of the module 1415. The rings 1403 are adapted to provide controlled leakage of a portion of light beams emitted by the LED 1410. Alternatively or additionally, controlled leakage of light from the re-directing structure may also be achieved by introducing different corrugations in the outer surface of the module, as is schematically shown in FIG. 15.

The embodiments described above have all illustrated the LED including a light emitting die covered with a dome. The optical units 600 and 1400 may also be implemented without including the domes 614 and 1414. Instead, the monolithic module itself may be used to perform the functions of the dome over the light emitting die. In such embodiments, the monolithic module may be referred to as a "primary" optical component.

Further, optical units described above could also be made rotationally symmetric with respect to all angles and/or, while the illustrated embodiments are particularly advantageous for use with the top-emitting LEDs, the teachings of the present invention could also be applied for use with side-emitting LEDs.

In addition, while the embodiments described herein all include a sharp peak in the inner surface of the monolithic module, embodiments with the inner surface comprising a peak of a different shape are also within the scope of the present invention. FIG. 16 illustrates monolithic modules with inner surfaces comprising peaks of different shapes, according to various embodiments of the present invention.

While the description of the modified inner surface of a monolithic module was provided above with reference to the optical unit 200A, considerations similar to those provided with respect to FIGS. 6A-16 could be applied to modify the optical units 200B and 300 so that their inner surfaces would also include a peak. Since a person skilled in the art would easily recognize how to adapt the considerations provided with respect to FIGS. 6A-16 to other shapes of the monolithic module, detailed discussion of such adaptations is not necessary here.

While the forgoing is directed to embodiments of the present invention, other and further embodiments of the invention may be devised without departing from the basic scope thereof. Therefore, the scope of the present invention is determined by the claims that follow.

The invention claimed is:

1. An optical unit, comprising:
a light emitting device disposed on a surface; and
a monolithic module encompassing the light emitting device and comprising a re-directing portion and a first diffusing portion, wherein:
the first diffusing portion is configured to diffuse light incident thereon, and
the re-directing portion is configured to re-direct
at least a first portion of light emitted by the light emitting device to be incident on the first diffusing portion,
wherein the monolithic module includes an inner surface that forms a chamber in which at least part of the light emitting device is disposed and wherein at least a portion of the inner surface transitions from a concave structure to a convex structure.

2. The optical unit according to claim 1, wherein the re-directing portion is further configured to re-direct a second portion of light emitted by the light emitting device to not be incident on the first diffusing portion.

3. The optical unit according to claim 2 wherein the second portion of light comprises less than 45% of the light emitted by the light emitting device.

4. The optical unit according to claim 1, wherein the monolithic module further comprises a second diffusing portion, and wherein the re-directing portion is further configured to re-direct another portion of light emitted by the light emitting device to be incident on the second diffusing portion so that a projection of the re-directed first portion of light onto the surface and a projection of the re-directed other portion of light onto the surface form an angle between 0 degrees and 180 degrees.

5. The optical unit according to claim 1, wherein the monolithic module is rotationally symmetric with an axis of symmetry of the monolithic module coinciding with an axis of symmetry of a beam pattern of the light emitting device.

6. The optical unit according to claim 1, wherein the light emitting device comprises a light emitting die and a dome disposed over the light emitting die, and wherein the monolithic module is disposed over the dome.

7. The optical unit according to claim 1, wherein the light emitting device comprises a light emitting die and the monolithic module is disposed immediately over the die.

8. The optical unit according to claim 1, wherein the re-directing portion is configured to re-direct light by total internal reflection.

9. The optical unit according to claim 1, wherein the first diffusing portion comprises diffusive material applied on parts of the re-directing portion.

10. The optical unit according to claim 9, further comprising a diffusing cover configured to diffusively transmit light incident thereon, wherein the first diffusing portion is configured to diffusively reflect at least a portion of light incident thereon to be incident on the diffusing cover.

11. The optical unit according to claim 1, wherein the monolithic module comprises an outer surface and wherein:

the inner surface is adapted to refract at least a first part of the first portion of light emitted by the light emitting device to be incident on the outer surface, the outer surface is adapted to reflect the first part of the first portion of light incident thereon by total internal reflection, and the inner surface comprises a peak.

12. The optical unit according to claim 11, wherein the inner surface is rotationally symmetric with an axis of symmetry of the inner surface adapted to coincide with an axis of symmetry of a beam pattern of the light emitting device, or the monolithic module is rotationally symmetric with an axis of symmetry of the monolithic module adapted to coincide with the axis of symmetry of the beam pattern of the light emitting device.

13. The optical unit according to claim 12, wherein, in a cross-section of the monolithic module, the cross-section including the axis of symmetry of the beam pattern of the light emitting device, the peak is at a point along the axis of symmetry of the beam pattern of the light emitting device.

14. The optical unit according to claim 1, wherein the concave structure is disposed between said convex structure and said surface on which the light emitting device is disposed.

* * * * *